(12) United States Patent
Manolakos et al.

(10) Patent No.: US 11,917,441 B2
(45) Date of Patent: Feb. 27, 2024

(54) PRIORITIZATION OF POSITIONING-RELATED REPORTS IN UPLINK

(71) Applicant: QUALCOMM Incorporated, San Diego, CA (US)

(72) Inventors: Alexandros Manolakos, Escondido, CA (US); Weimin Duan, San Diego, CA (US); Seyedkianoush Hosseini, San Diego, CA (US); Linhai He, San Diego, CA (US); Jay Kumar Sundararajan, San Diego, CA (US); Wanshi Chen, San Diego, CA (US); Krishna Kiran Mukkavilli, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 17/467,969

(22) Filed: Sep. 7, 2021

(65) Prior Publication Data

US 2022/0078654 A1    Mar. 10, 2022

Related U.S. Application Data

(60) Provisional application No. 63/076,752, filed on Sep. 10, 2020.

(51) Int. Cl.
*H04W 24/10*    (2009.01)
*H04W 64/00*    (2009.01)
(Continued)

(52) U.S. Cl.
CPC ......... *H04W 24/10* (2013.01); *H04W 64/006* (2013.01); *H04W 72/23* (2023.01); *H04W 72/566* (2023.01)

(58) Field of Classification Search
CPC ... H04W 24/10; H04W 72/566; H04W 72/23; H04W 64/006
(Continued)

(56) References Cited

U.S. PATENT DOCUMENTS

2019/0075548 A1*  3/2019  Lee .................... H04W 4/40
2019/0342874 A1*  11/2019 Davydov ............. H04W 72/23

FOREIGN PATENT DOCUMENTS

| EP | 2445245 A1 | 4/2012 |
| WO | 2007013850 A2 | 2/2007 |
| WO | 2019133048 A1 | 7/2019 |

OTHER PUBLICATIONS

International Search Report and Written Opinion—PCT/US2021/049464—ISA/EPO—dated Dec. 9, 2021.

* cited by examiner

*Primary Examiner* — Christopher R Crompton
(74) *Attorney, Agent, or Firm* — QUALCOMM Incorporated

(57) ABSTRACT

Disclosed are various techniques for wireless communication. In an aspect, a user equipment (UE) may identify at least one communication resource from a plurality of communication resources for transmitting a positioning report, wherein the plurality of communication resources for transmitting the positioning report have different priorities. The UE may transmit the positioning report via the at least one communication resource, wherein the at least one communication resource comprises at least one of a medium access control (MAC) control element (MAC-CE) logical channel ID or a signaling radio bearer (SRB).

30 Claims, 12 Drawing Sheets

(51) Int. Cl.
*H04W 72/23* (2023.01)
*H04W 72/566* (2023.01)

(58) Field of Classification Search
USPC .......................................................... 370/329
See application file for complete search history.

PRIORITIZATION OF POSITIONING-RELATED REPORTS IN UPLINK

CROSS-REFERENCE TO RELATED APPLICATION

This application claims priority to U.S. Provisional Patent Application No. 63/076,752, filed Sep. 10, 2020, entitled "PRIORITIZATION OF POSITIONING-RELATED REPORTS IN UPLINK," which is assigned to the assignee hereof and is expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes identifying at least one communication resource from a plurality of communication resources for transmitting a positioning report, wherein the plurality of communication resources for transmitting the positioning report have different priorities; and transmitting the positioning report via the at least one communication resource, wherein the at least one communication resource comprises at least one of a medium access control (MAC) control element (MAC-CE) logical channel ID or a signaling radio bearer (SRB).

In an aspect, a method of wireless communication performed by a network entity includes transmitting, to a user equipment (UE), information for mapping a positioning report to at least one communication resource from a plurality of communication resources for transmitting the positioning report, wherein the plurality of communication resources for transmitting the positioning report have different priorities; receiving, from the UE, a positioning report via at least one of the plurality of communication resources for transmitting the positioning report; and determining a priority of the positioning report based on the at least one of the plurality of communication resources for transmitting the positioning report, wherein the at least one communication resource comprises at least one of a medium access control (MAC) control element (MAC-CE) logical channel ID or a signaling radio bearer (SRB).

In an aspect, a user equipment (UE) includes a memory; at least one transceiver; and at least one processor communicatively coupled to the memory and the at least one transceiver, the at least one processor configured to: identify at least one communication resource from a plurality of communication resources for transmitting a positioning report, wherein the plurality of communication resources for transmitting the positioning report have different priorities; and transmit, via the at least one transceiver, the positioning report via the at least one communication resource, wherein the at least one communication resource comprises at least one of a medium access control (MAC) control element (MAC-CE) logical channel ID or a signaling radio bearer (SRB).

In an aspect, a network entity includes a memory; at least one transceiver; and at least one processor communicatively coupled to the memory and the at least one transceiver, the at least one processor configured to: transmit, via the at least one transceiver, to a user equipment (UE), information for mapping a positioning report to at least one communication resource from a plurality of communication resources for transmitting the positioning report, wherein the plurality of communication resources for transmitting the positioning report have different priorities; receive, via the at least one transceiver, from the UE, a positioning report via at least one of the plurality of communication resources for transmitting the positioning report; and determine a priority of the positioning report based on the at least one of the plurality of communication resources for transmitting the positioning report, wherein the at least one communication resource comprises at least one of a medium access control (MAC) control element (MAC-CE) logical channel ID or a signaling radio bearer (SRB).

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
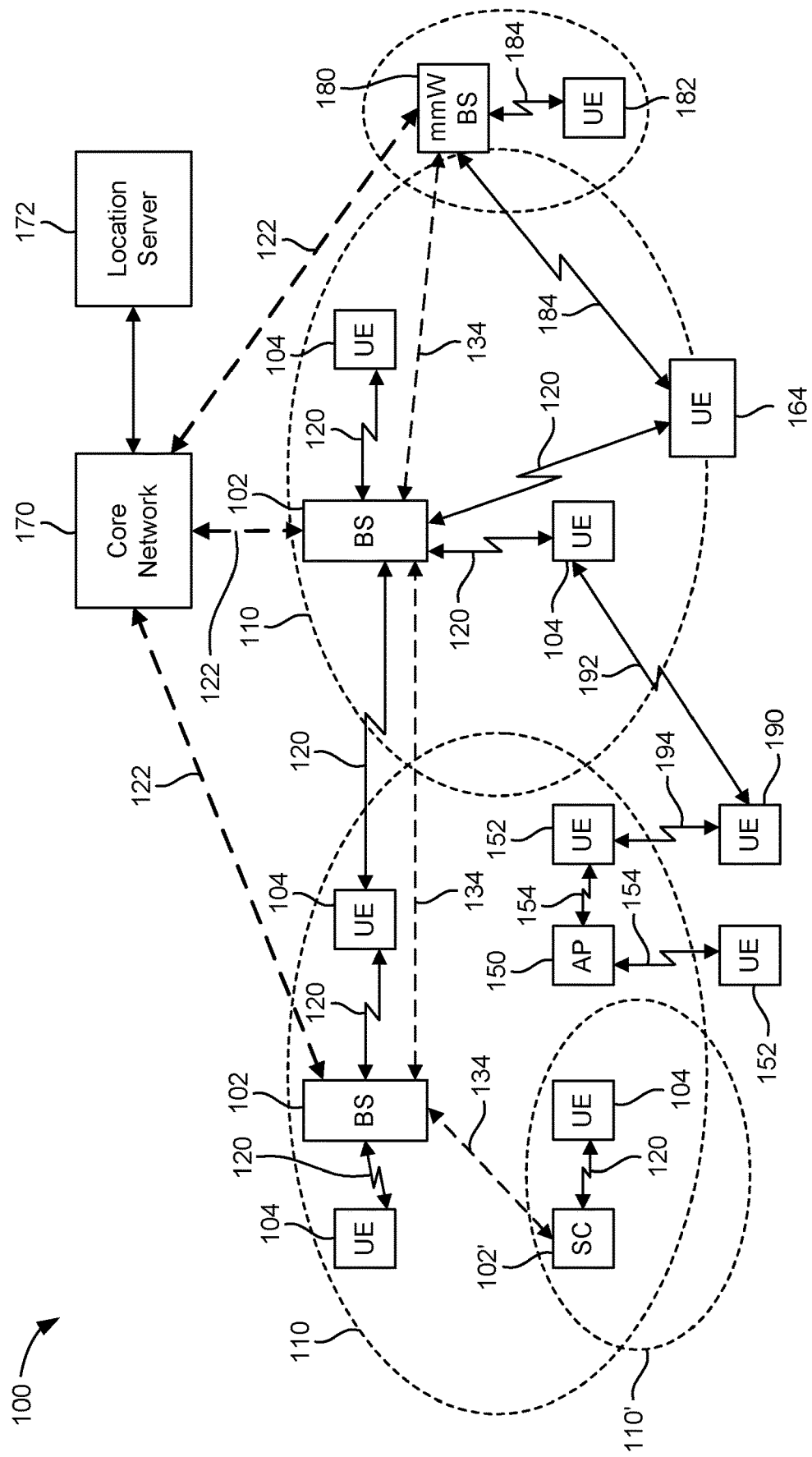
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

To overcome the technical disadvantages of conventional systems and methods described above, mechanisms by which the bandwidth (BW) used by a user equipment (UE) for positioning reference signal (PRS) can be dynamically adjusted, e.g., response to environmental conditions, are presented. For example, a UE receiver may indicate to a transmitting entity a condition of the environment in which the UE is operating, and in response the transmitting entity may adjust the PRS bandwidth.

The words "exemplary" and "example" are used herein to mean "serving as an example, instance, or illustration." Any aspect described herein as "exemplary" or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" (UT), a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network, to the Internet, or to both are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, signaling connections, or various combinations thereof for the supported UEs. In some systems a base station may provide purely edge node signaling functions while in other systems it may provide additional control functions, network management functions, or both. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, signaling connections, or various combinations thereof for UEs), but may instead transmit reference signals to UEs to be measured by the UEs, may receive and measure signals transmitted by the UEs, or both. Such a base station may be referred to as a positioning beacon (e.g., when transmitting signals to UEs), as a location measurement unit (e.g., when receiving and measuring signals from UEs), or both.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an exemplary wireless communications system 100 according to various aspects. The wireless communications system 100 (which may also be referred to as a wireless wide area network (WWAN)) may include various base stations 102 and various UEs 104. The base stations 102 may include macro cell base stations (high power cellular base stations), small cell base stations (low power cellular base stations), or both. In an aspect, the macro cell base station may include eNBs, ng-eNBs, or both, where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102, downlink (also referred to as forward link) transmissions from a base station 102 to a UE 104, or both. The communication links 120 may use MIMO antenna technology, including spatial multiplexing, beamforming, transmit diversity, or various combinations thereof. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152, the WLAN AP 150, or various combinations thereof may perform a clear channel assessment (CCA) or listen before talk (LBT) procedure prior to communicating in order to determine whether the channel is available.

The small cell base station 102' may operate in a licensed, an unlicensed frequency spectrum, or both. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to the access network, increase capacity of the access network, or both. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies, in near mmW frequencies, or a combination thereof in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit, receive, or both) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting, adjust the phase setting, or a combination thereof, of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), narrowband reference signals (NRS) tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102, the mmW base station 180, or a combination thereof may be secondary carriers ("SCells"). The simultaneous transmission, reception, or both of multiple carriers enables the UE 104/182 to significantly increase its data transmission rates, reception rates, or both. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120, with the mmW base station 180 over a mmW communication link 184, or a combination thereof. For example, the macro cell base station 102 may support a PCell and one or more SCells for the UE 164 and the mmW base station 180 may support one or more SCells for the UE 164.

Figure 2A:
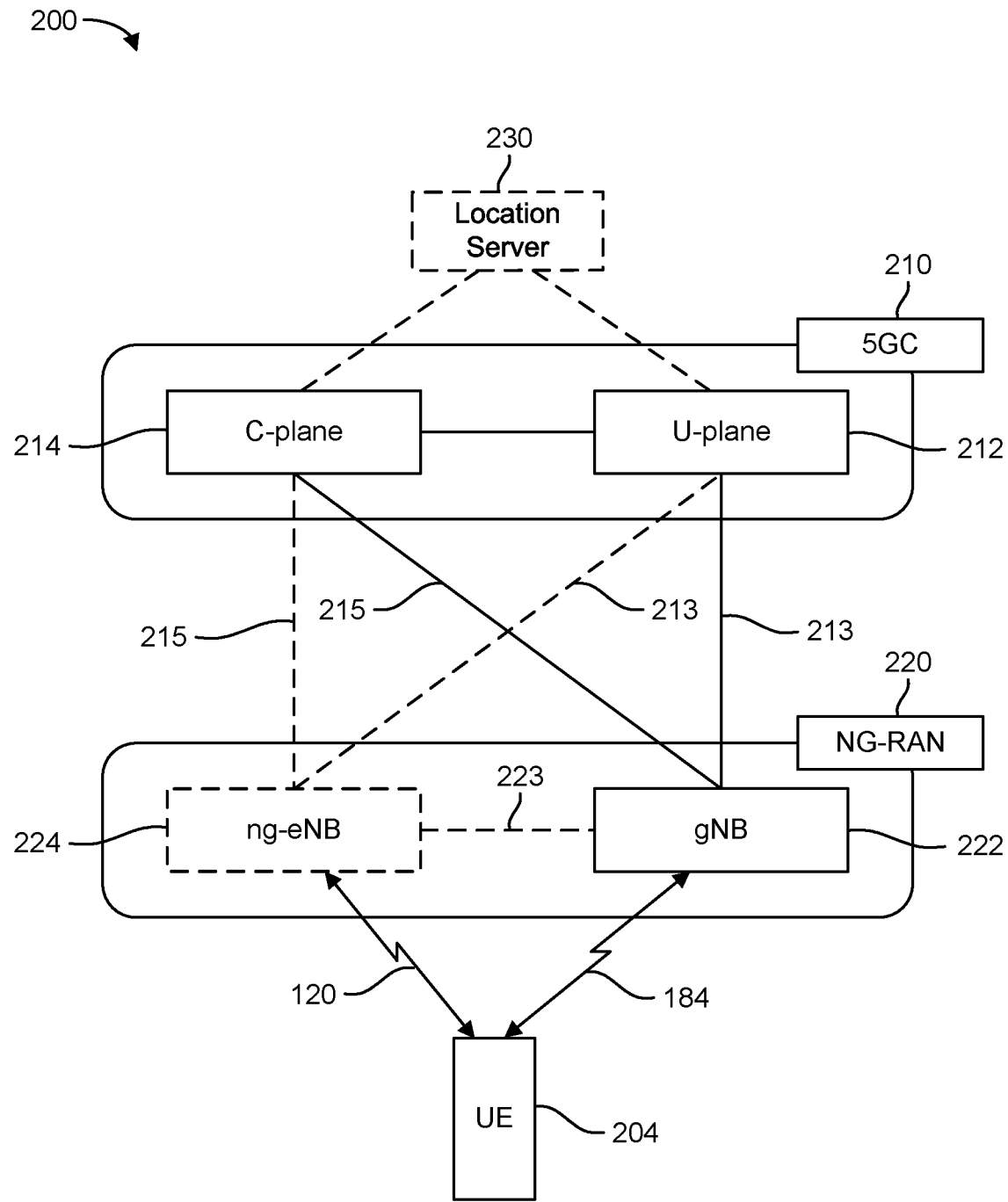
FIGS. 2A and 2B illustrate example wireless network structures, according to various aspects.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
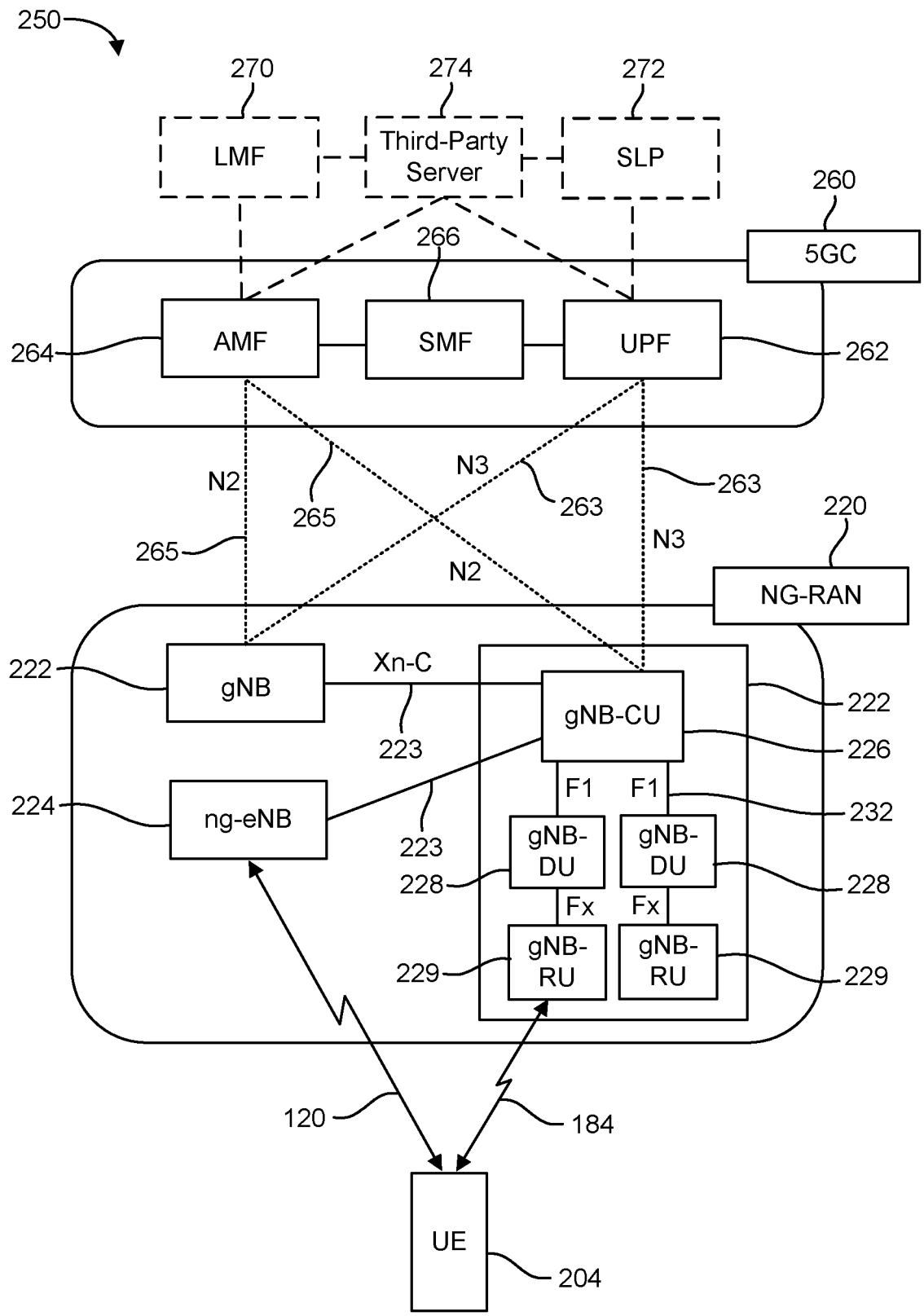

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
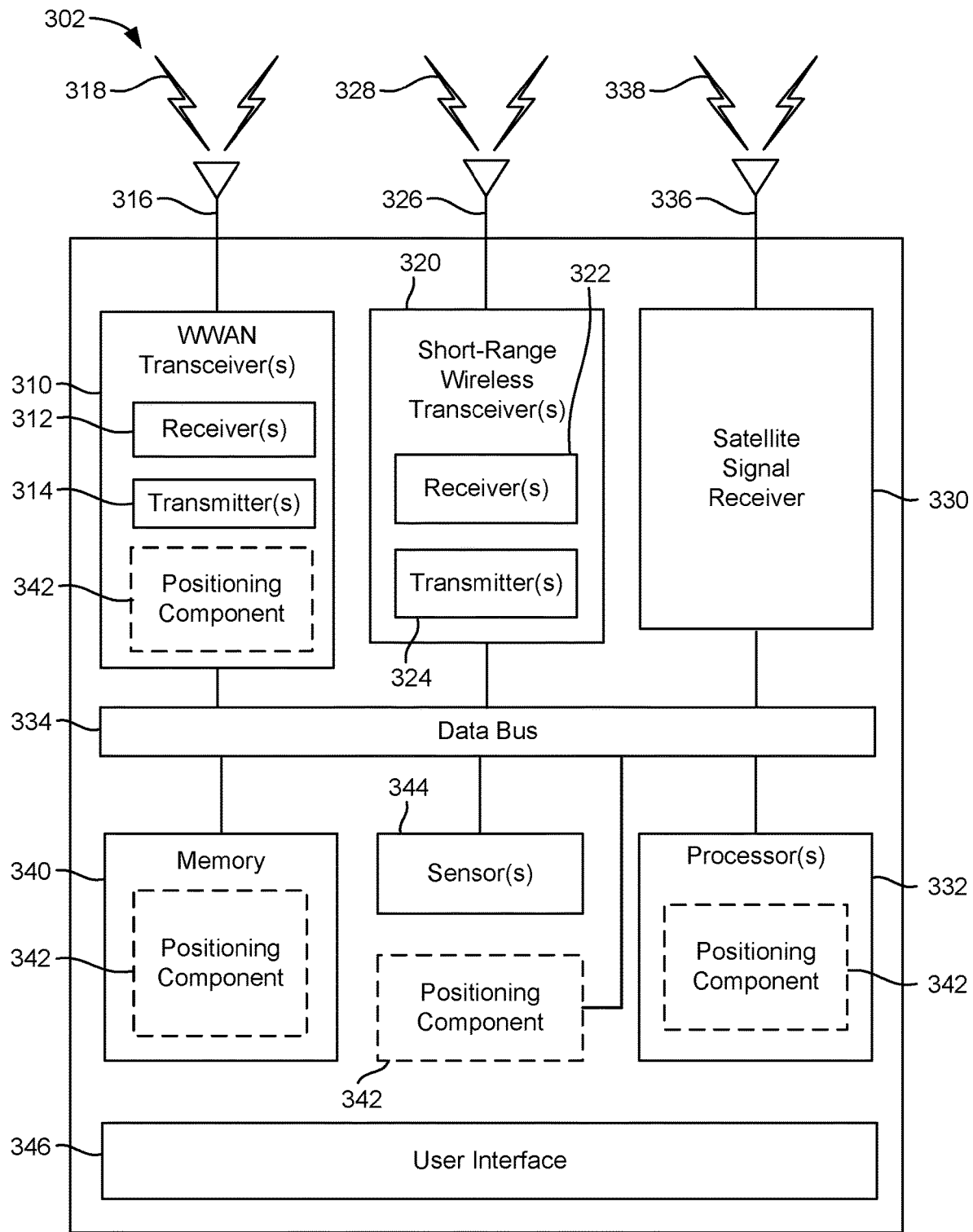
FIGS. 3A, 3B, and 3C are simplified block diagrams of several sample aspects of components that may be employed in a user equipment (UE), a base station, and a network entity, respectively, and configured to support communications as taught herein.
Figure 3B:
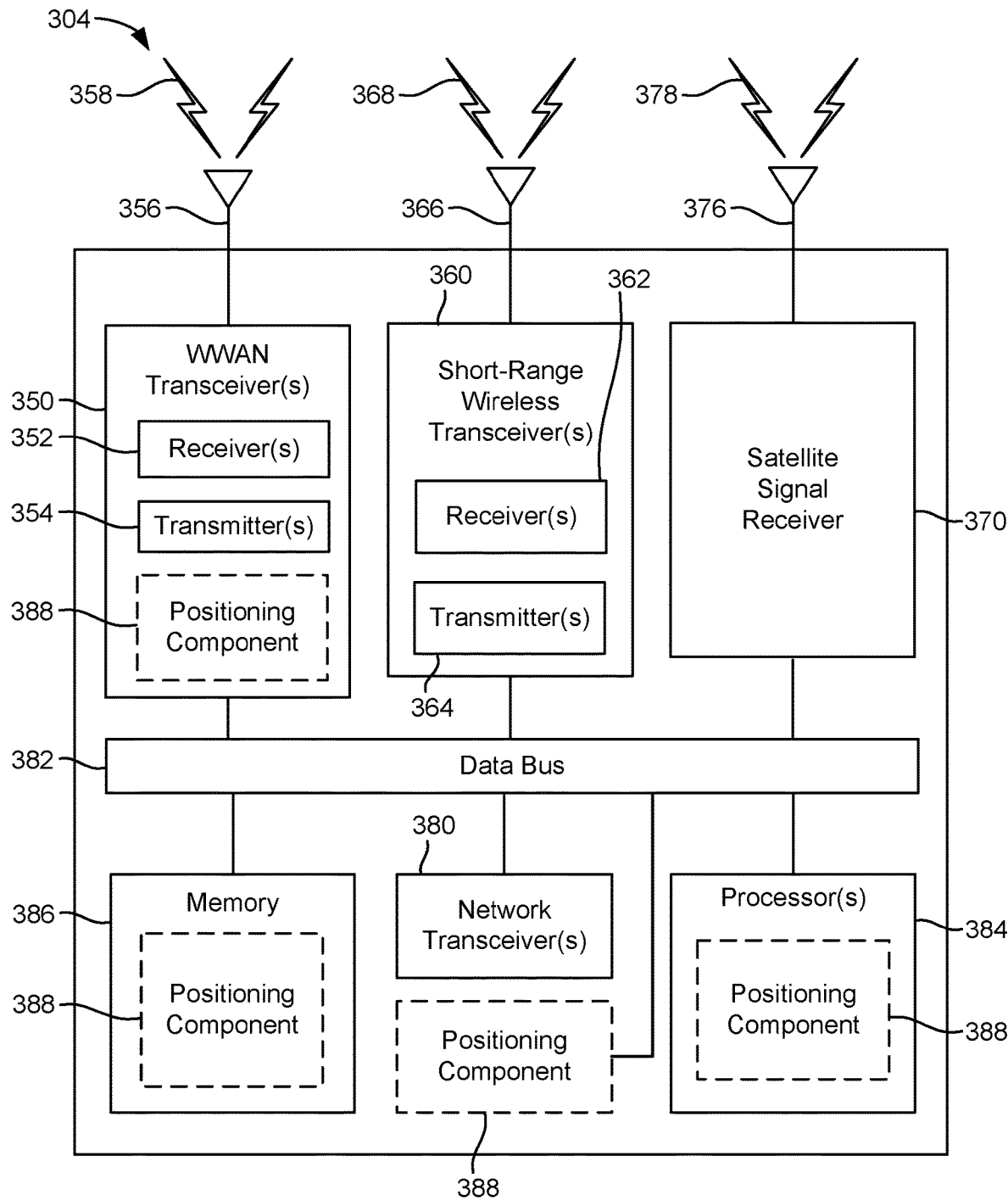
Figure 3C:
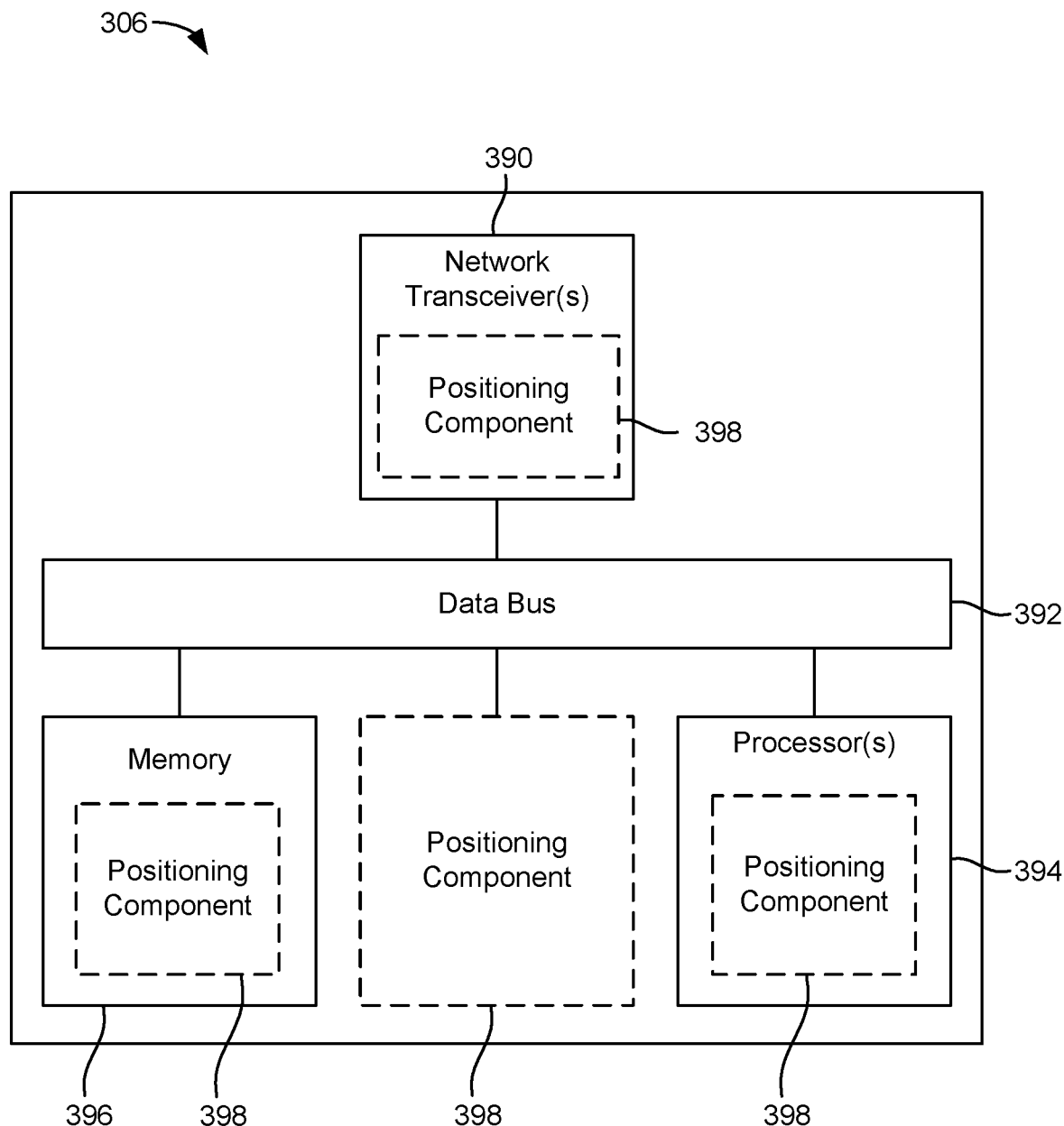

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, narrowband reference signal (NRS), CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 172, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning slots, periodicity of positioning slots, muting sequence, frequency hopping sequence, reference signal identifier (ID), reference signal bandwidth, slot offset, etc.), other parameters applicable to the particular positioning method, or a combination thereof. Alternatively, the assistance data may originate directly from the base stations themselves (e.g., in periodically broadcasted overhead messages, etc.). In some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Various frame structures may be used to support downlink and uplink transmissions between network nodes (e.g., base stations and UEs).

Figure 4A:
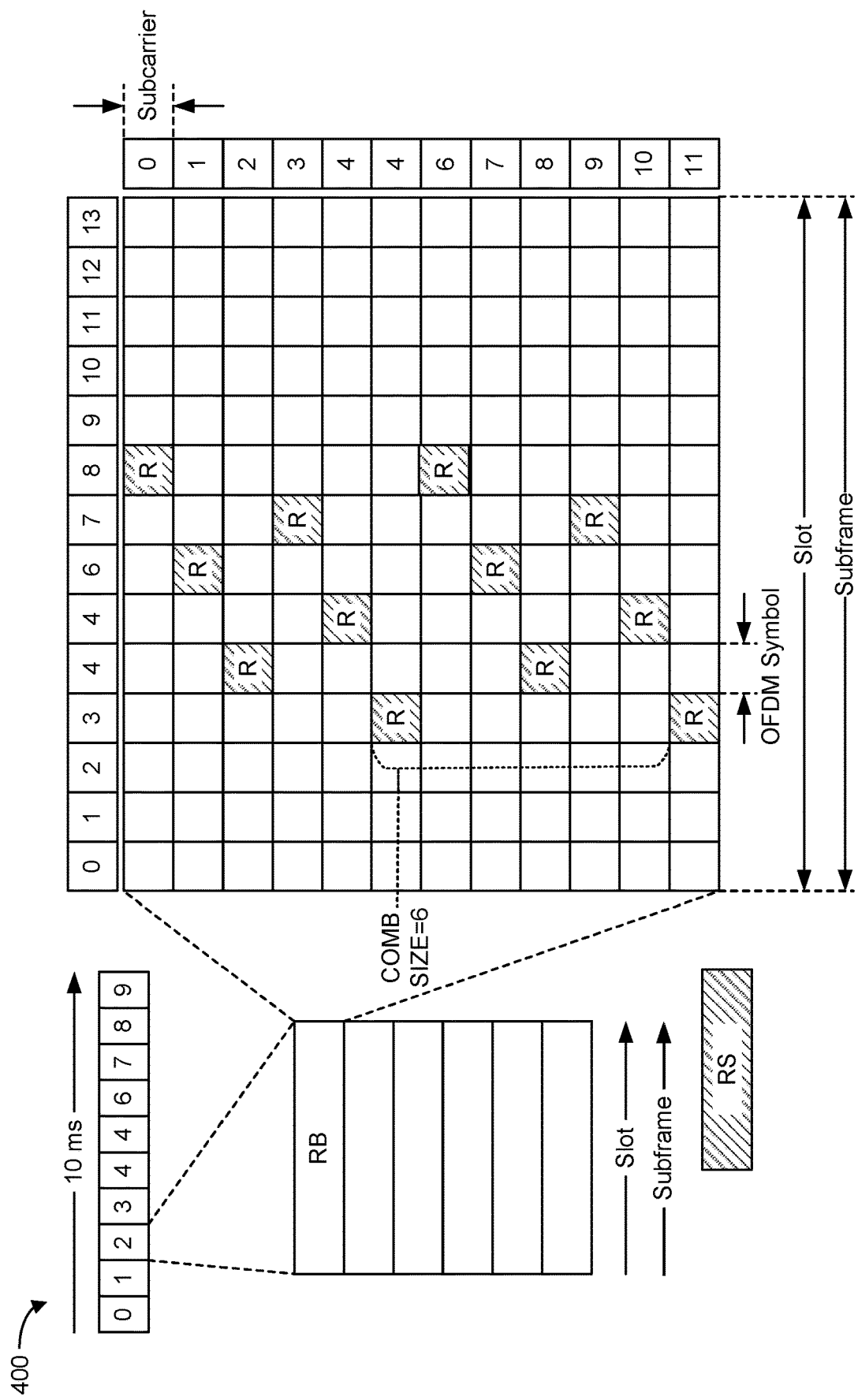
FIGS. 4A and 4B are diagrams illustrating example frame structures and channels within the frame structures, according to aspects of the disclosure.

FIG. 4A is a diagram 400 illustrating an example of a downlink frame structure, according to aspects.

Figure 4B:
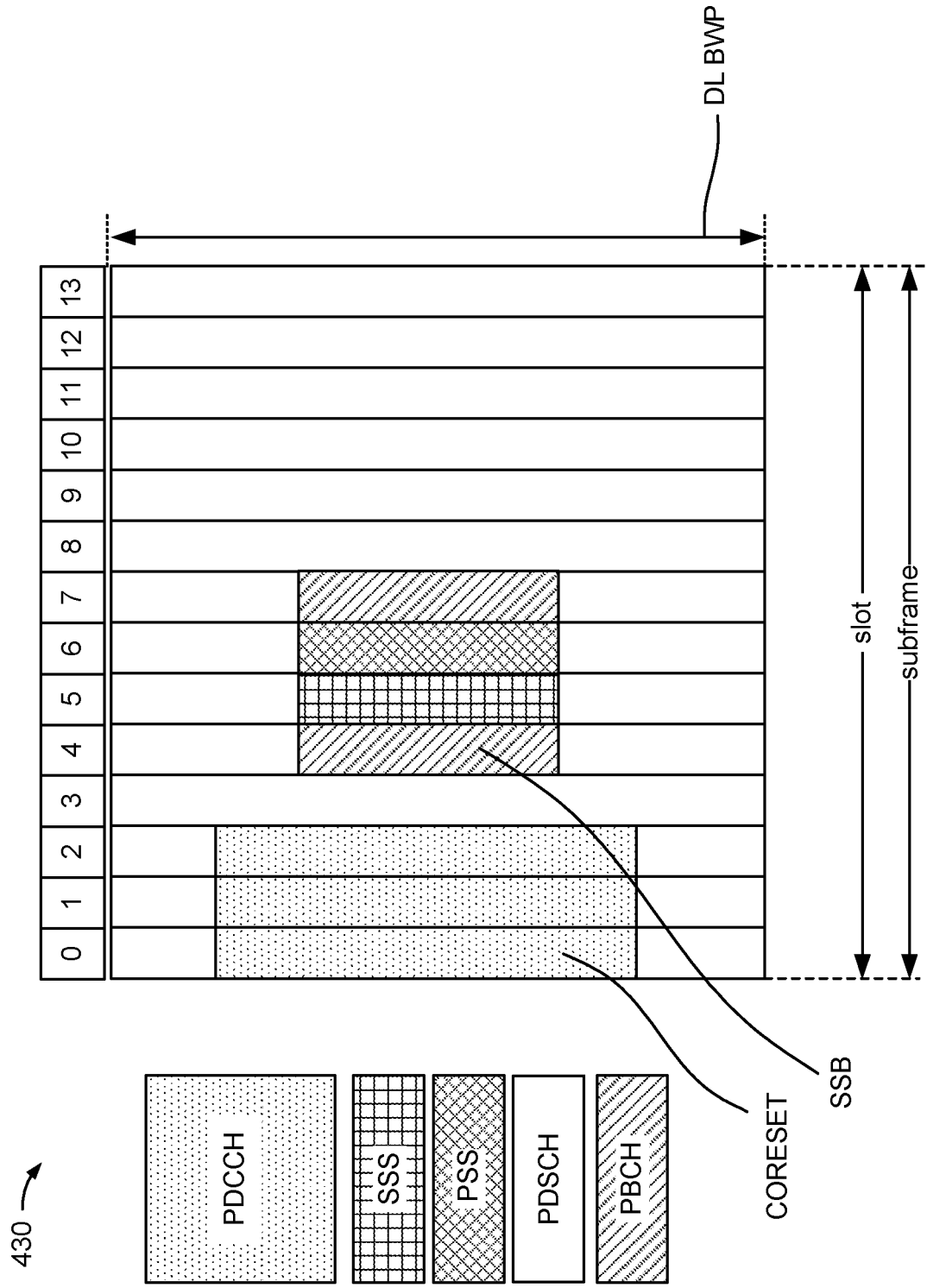

FIG. 4B is a diagram 430 illustrating an example of channels within the downlink frame structure, according to aspects. Other wireless communications technologies may have different frame structures, different channels, or both.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 504, 1024, or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (μ), for example, subcarrier spacing of 15 kHz, 30 kHz, 60 kHz, 120 kHz, and 240 kHz or greater may be available. Table 1 provided below lists some various parameters for different NR numerologies.

CSI-RS, DMRS, PSS, SSS, SSB, etc. FIG. 4A illustrates exemplary locations of REs carrying PRS (labeled "R").

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," a "positioning repetition," or simply an "occasion," an "instance," or a "repetition."

A collection of resource elements (REs) that are used for transmission of PRS is referred to as a "PRS resource." The collection of resource elements can span multiple PRBs in the frequency domain and 'N' (e.g., 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each of the fourth symbols of the PRS resource configuration, REs corresponding to every fourth subcarrier (e.g., subcarriers 0, 4, 8) are used to transmit PRS of the PRS resource. Currently, comb sizes of comb-2, comb-4, comb-6, and comb-12 are sup-

TABLE 1

Parameters For Different NR Numerologies

| μ | SCS (kHz) | Symbols/Sot | Slots/Subframe | Slots/Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 200 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 4A and 4B, a numerology of 15 kHz is used. Thus, in the time domain, a 10 millisecond (ms) frame is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In NR, a subframe is 1 ms in duration, a slot is fourteen symbols in the time domain, and an RB contains twelve consecutive subcarriers in the frequency domain and fourteen consecutive symbols in the time domain. Thus, in NR there is one RB per slot. Depending on the SCS, an NR subframe may have fourteen symbols, twenty-eight symbols, or more, and thus may have 1 slot, 2 slots, or more. The number of bits carried by each RE depends on the modulation scheme.

Some of the REs carry downlink reference (pilot) signals (DL-RS). The DL-RS may include PRS, TRS, PTRS, CRS, ported for DL PRS. FIG. 4A illustrates an exemplary PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (e.g., PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^{\mu} \cdot \{4, 5, 8, 10, 16, 20, 32, 40, 64, 80, 160, 320, 640, 1280, 2560, 5040, 10240\}$ slots, with μ=0, 1, 2, 3. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter ARFCN-ValueNR (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it could be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

PRS are defined for NR positioning to enable UEs to detect and measure neighboring TRPs. Several configuration are supported to enable a variety of deployments (indoor, outdoor, sub-6, millimeter wave (mmW), and others). Both UE assisted and UE based position calculation is supported in Release 16 and 17.

TABLE 2

Reference Signals For Positioning In NR

| DL/UL Reference Signals | UE Measurements | To facilitate support of the following positioning techniques |
|---|---|---|
| Rel.16 DL PRS | DL RSTD | DL-TDOA |
| Rel.16 DL PRS | DL PRS RSRP | DL-TDOA, DL-AoD, Multi-RTT |
| Rel.16 DL PRS/ Rel.16 SRS for positioning | UE Rx-Tx time difference | Multi-RTT |
| Rel.15 SSB/ CSI-RS for RRM | SS-RSRP (RSRP for RRM), SS-RSRQ (for RRM), CSI-RSRP (for RRM), CSI-RSRQ (for RRM) | E-CID |

Logical channel prioritization (LCP) is a procedure that is applied whenever a new transmission is performed by the UE. LCP includes rules that determine what logical channels (which are MAC layer entities) that the UE can include in an UL transmission when the UE receives an UL grant.

For data, RRC controls the scheduling of uplink data by signalling, for each logical channel per MAC entity, the following:
- priority where an increasing priority value indicates a lower priority level;
- prioritisedBitRate, which sets the Prioritized Bit Rate (PBR);
- bucketSizeDuration, which sets the Bucket Size Duration (BSD).

RRC additionally controls the LCP procedure by configuring mapping restrictions for each logical channel, which may include the following:
- allowedSCS-List, which sets the allowed Subcarrier Spacing(s) for transmission;
- maxPUSCH-Duration, which sets the maximum PUSCH duration allowed for transmission;
- configuredGrantType1Allowed, which sets whether a configured grant Type 1 can be used for transmission;
- allowedServingCells, which sets the allowed cell(s) for transmission;
- allowedCG-List, which sets the allowed configured grant(s) for transmission;
- allowedPHY-PriorityIndex, which sets the allowed PHY priority index(es) of a dynamic grant for transmission.

The following UE variable is used for the Logical channel prioritization procedure:
- Bj, which is maintained for each logical channel j.

LCP includes a filtering process, which excludes from consideration logical channels that do not meet requirements defined by the UL grant. When a new transmission is to be performed, the MAC entity will select the logical channels for each UL grant that satisfy all of the following conditions:
- The set of allowed Subcarrier Spacing index values in allowedSCS-List, if configured, includes the Subcarrier Spacing index associated to the UL grant; and
- The maxPUSCH-Duration, if configured, is larger than or equal to the PUSCH transmission duration associated to the UL grant; and
- The configuredGrantType1Allowed, if configured, is set to true in case the UL grant is a Configured Grant Type 1; and
- The allowedServingCells, if configured, includes the Cell information associated to the UL grant. Does not apply to logical channels associated with a dedicated radio bearer (DRB) configured with PDCP duplication within the same MAC entity (i.e. CA duplication) for which PDCP duplication is deactivated; and
- The allowedCG-List, if configured, includes the configured grant index associated to the UL grant; and
- The allowedPHY-PriorityIndex, if configured, includes the priority index (as specified in clause 9 of 3GPP technical specification (TS) 38.213) associated to the dynamic UL grant.

The Subcarrier Spacing index, physical uplink shared channel (PUSCH) transmission duration, Cell information, and priority index are included in Uplink transmission information received from lower layers for the corresponding scheduled uplink transmission.

LCP includes a prioritization process, which prioritizes logical channels that were not excluded by the filtering process. Logical channels will be added for inclusion in the UL transmission in order or priority until there is no more space for additional logical channels. Thus, lower-priority logical channels may not be included if there is not enough space for them in the UL transmission. Logical channels shall be prioritized in accordance with the following order (highest priority listed first):

TABLE 3

Conventional Logical Channel Priority

MAC CE for cell radio network temporary identifier (C-RNTI), or Data from UL common control channel (CCCH)
MAC CE for configured grant (CG) confirmation, or MAC CE for multiple entry CG confirmation, or MAC CE for beam failure recovery (BFR)*
MAC CE for sidelink (SL) CG Confirmation
MAC CE for listen-before-talk (LBT) failure
MAC CE for SL buffer status report (BSR) prioritized according to clause 5.22.1.6
MAC CE for BSR, except for BSR included for padding
MAC CE for single entry power headroom report (PHR), or MAC CE for multiple entry PHR
MAC CE for the number of desired guard symbols
MAC CE for pre-emptive BSR
MAC CE for SL-BSR, except for SL-BSR prioritized according to clause 5.22.1.6 and SL-BSR included for padding
Data from any Logical Channel, except data from UL-CCCH
MAC CE for recommended bit rate query
MAC CE for BSR included for padding
MAC CE for SL-BSR included for padding

*Prioritization among MAC CE for CG confirmation, MAC CE for multiple entry CG confirmation, and MAC CE for BFR is up to UE implementation.

Signaling Radio Bearers (SRBs) are defined as Radio Bearers (RBs) that are used only for the transmission of RRC and NAS messages. More specifically, the following SRBs are defined:

TABLE 4

Conventional Signaling Radio Bearers

SRB0 is for RRC messages using the CCCH logical channel;
SRB1 is for RRC messages (which may include a piggybacked NAS message) as well as for NAS messages prior to the establishment of SRB2, all using dedicated control channel (DCCH) logical channels;
SRB2 is for NAS (which may include LPP) messages, all using DCCH logical channel. SRB2 has a lower-priority than SRB1 and is always configured by the network after security activation;
SRB3 is for specific RRC messages when UE is in EUTRAN new radio dual connectivity (EN-DC), all using DCCH logical channel.

In downlink, piggybacking of NAS messages is used only for bearer establishment/modification/release. In uplink, piggybacking of NAS message is used only for transferring the initial NAS message during connection setup and connection resume. Once security is activated, all RRC messages on SRB1, SRB2 and SRB3, including those containing NAS messages, are integrity protected and ciphered by PDCP. NAS independently applies integrity protection and ciphering to the NAS messages. LPP is encapsulated within NAS, which is encapsulated within RRC.

TABLE 5

Default SRB Configurations Parameters

| Name | SRB1/1S | SRB2/2S | SRB3 |
|---|---|---|---|
| PDCP-Config | | | |
| t-Reordering | | infinity | |
| RLC-Config CHOICE | | Am | |
| ul-RLC-Config | | | |
| sn-FieldLength | | size 12 | |
| t-PollRetransmit | | ms45 | |
| pollPDU | | infinity | |
| pollByte | | infinity | |
| maxRetxThreshold | | t8 | |
| dl-RLC-Config | | | |

TABLE 5-continued

Default SRB Configurations Parameters

| Name | SRB1/1S | SRB2/2S | SRB3 |
|---|---|---|---|
| sn-FieldLength | | size 12 | |
| t-Reassembly | | ms35 | |
| logicalChannelIdentity | 1 | 2 | 3 |
| logicalChannelConfig | | | |
| priority | 1 | 3 | 1 |
| prioritisedBitRate | | infinity | |
| logicalChannelGroup | | 0 | |

Positioning quality of service (QoS) is indicated by an information element (IE). This IE indicates the quality of service and includes a number of sub-fields. In the case of measurements, some of the sub-fields apply to the location estimate that could be obtained by the server from the measurements provided by the target device assuming that the measurements are the only sources of error. The fields are as follows:

horizontalAccuracy indicates the maximum horizontal error in the location estimate at an indicated confidence level. The 'accuracy' corresponds to the encoded uncertainty as defined in TS 23.32 [15] and 'confidence' corresponds to confidence as defined in TS 23.32 [15].

verticalCoordinateRequest indicates whether a vertical coordinate is required (TRUE) or not (FALSE).

verticalAccuracy indicates the maximum vertical error in the location estimate at an indicated confidence level and is only applicable when a vertical coordinate is requested. The 'accuracy' corresponds to the encoded uncertainty altitude as defined in TS 23.32 [15] and 'confidence' corresponds to confidence as defined in TS 23.32 [15].

response Time:

time indicates the maximum response time as measured between receipt of the RequestLocationInformation and transmission of a ProvideLocationInformation. If the unit field is absent, this is given as an integer number of seconds between 1 and 128. If the unit field is present, the maximum response time is given in units of 10-seconds, between 10 and 1280 seconds. If the periodicalReporting IE is included in CommonIEsRequestLocationInformation, this field should not be included by the location server and shall be ignored by the target device (if included).

responseTimeEarlyFix indicates the maximum response time as measured between receipt of the RequestLocationInformation and transmission of a ProvideLocationInformation containing early location measurements or an early location estimate. If the unit field is absent, this is given as an integer number of seconds between 1 and 128. If the unit field is present, the maximum response time is given in units of 10-seconds, between 10 and 1280 seconds. When this IE is included, a target should send a ProvideLocationInformation (or more than one ProvideLocationInformation if location information will not fit into a single message) containing early location information according to the responseTimeEarlyFix IE and a subsequent ProvideLocationInformation (or more than one ProvideLocationInformation if location information will not fit into a single message) containing final location information according to the time IE. A target shall omit sending a ProvideLocationInformation if the early location information is not available at the expiration of the time value in the responseTimeEarlyFix IE. A server should set the responseTimeEarlyFix IE to a value less than that for the time IE. A target shall ignore the responseTimeEarlyFix IE if its value is not less than that for the time IE.

unit indicates the unit of the time and responseTimeEarlyFix fields. Enumerated value 'ten-seconds' corresponds to a resolution of 10 seconds. If this field is absent, the unit/resolution is 1 second.

velocityRequest indicates whether velocity (or measurements related to velocity) is requested (TRUE) or not (FALSE).

horizontalAccuracyExt indicates the maximum horizontal error in the location estimate at an indicated confidence level. The 'accuracyExt' corresponds to the encoded high accuracy uncertainty as defined in TS 23.32 [15] and 'confidence' corresponds to confidence as defined in TS 23.32 [15]. This field should not be included by the location server and shall be ignored by the target device if the horizontalAccuracy field is included in QoS.

verticalAccuracyExt indicates the maximum vertical error in the location estimate at an indicated confidence level and is only applicable when a vertical coordinate is requested. The 'accuracyExt' corresponds to the encoded high accuracy uncertainty as defined in TS 23.32 [15] and 'confidence' corresponds to confidence as defined in TS 23.32 [15]. This field should not be included by the location server and shall be ignored by the target device if the verticalAccuracy field is included in QoS.

All QoS requirements shall be obtained by the target device to the degree possible but it is permitted to return a response that does not fulfill all QoS requirements if some were not attainable. The single exception is time and timeNB which shall always be fulfilled—even if that means not fulfilling other QoS requirements. A target device supporting NB-IoT access shall support the responseTimeNB IE. A target device supporting high accuracy (HA) global navigation satellite system (GNSS) shall support the HorizontalAccuracyExt, VerticalAccuracyEx, and unit fields. A target device supporting NB-IoT access and HA GNSS shall support the unitNB field.

The Third Generation Partnership Project (3GPP) radio access network (RAN) working group 1 (RAN1) has come to some agreements on latency. The agreements include the following:

In Rel-17 target positioning requirements for commercial use cases are defined as follows:
Horizontal position accuracy (<1 m) for [90%] of UEs;
Vertical position accuracy (<[2 or 3] m) for [90%] of UEs;
End-to-end latency for position estimation of UE (<[100 ms]);
For future study: Physical layer latency for position estimation of UE (<[10 ms]).

In Rel-17 target positioning requirements for IIoT use cases are defined as follows:
Horizontal position accuracy (<X m) for [90%] of UEs: X=[0.2 or 0.5] m;
Vertical position accuracy (<Y m) for [90%] of UEs: Y=[0.2 or 1] m;
End-to-end latency for position estimation of UE [10 ms, 20 ms, or 100 ms]);

For future study: Physical layer latency for position estimation of UE [10 ms]). Note: Target positioning requirements may not necessarily be reached for all scenarios.

Physical layer latency can be evaluated through analysis and, optionally, numerical evaluation.

Higher layer positioning latency can be evaluated.

For future study: which higher-layers should be included in the evaluation;

For future study: Physical layer latency for position estimation of UE [10 ms]).

Figure 5:
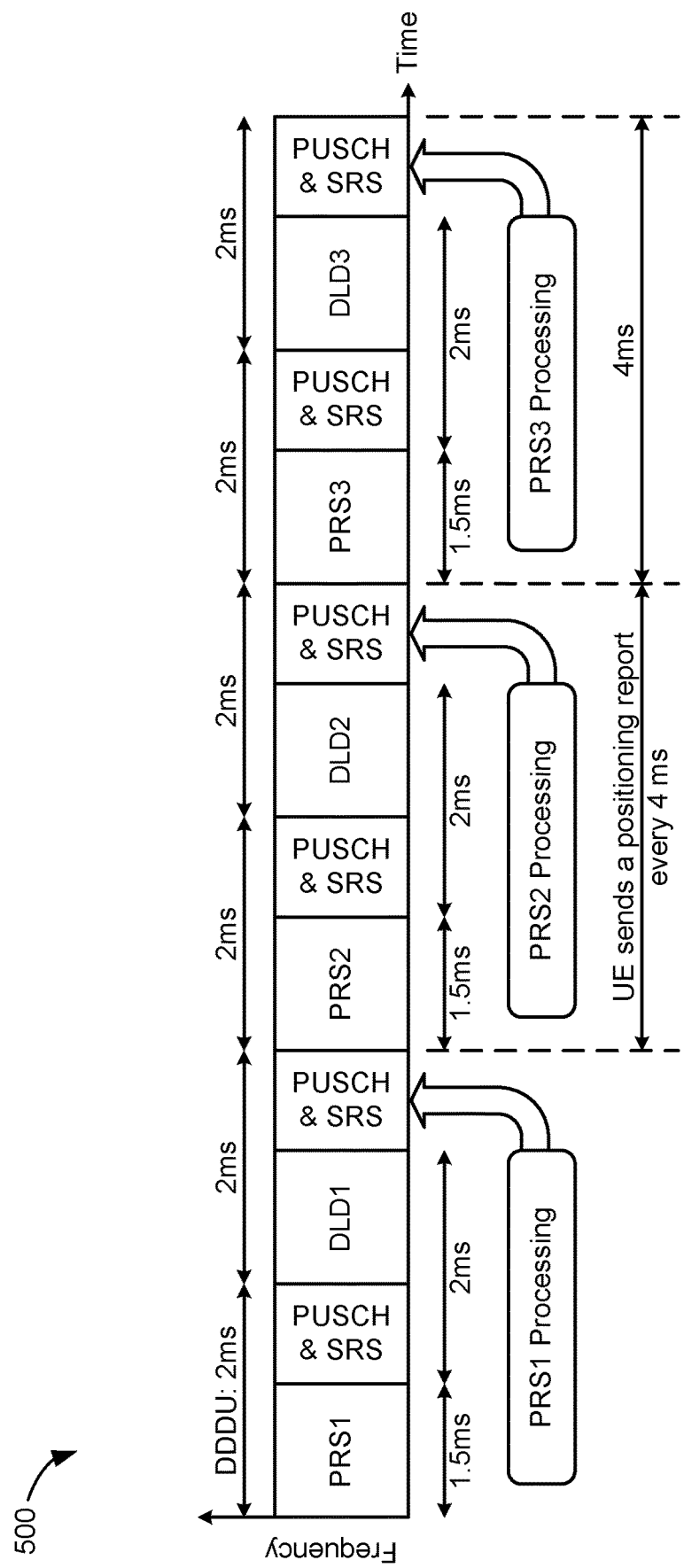
FIG. 5 illustrates an example of best physical layer latency in new radio (NR).

FIG. 5 is a time-frequency graph 500 showing transmission and processing timing in an example of best PHY-layer latency in NR. Starting from the left side of the graph, the UE receives and measures a first positioning reference signal (PRS1), and starts processing PRS1. After PRS1, the UE transmits PUSCH and a sounding reference signal (SRS), then receives first downlink data (DLD1), during which time the UE continues to process PRS1. After DLD1, the UE again transmits PUSCH and SRS, including the results of processing PRS1. This process repeats, including receiving, processing, and reporting PRS2, and repeats again, including receiving, processing, and reporting PRS3, and so on. In this manner, the UE sends a positioning report every 4 ms.

Figure 6:
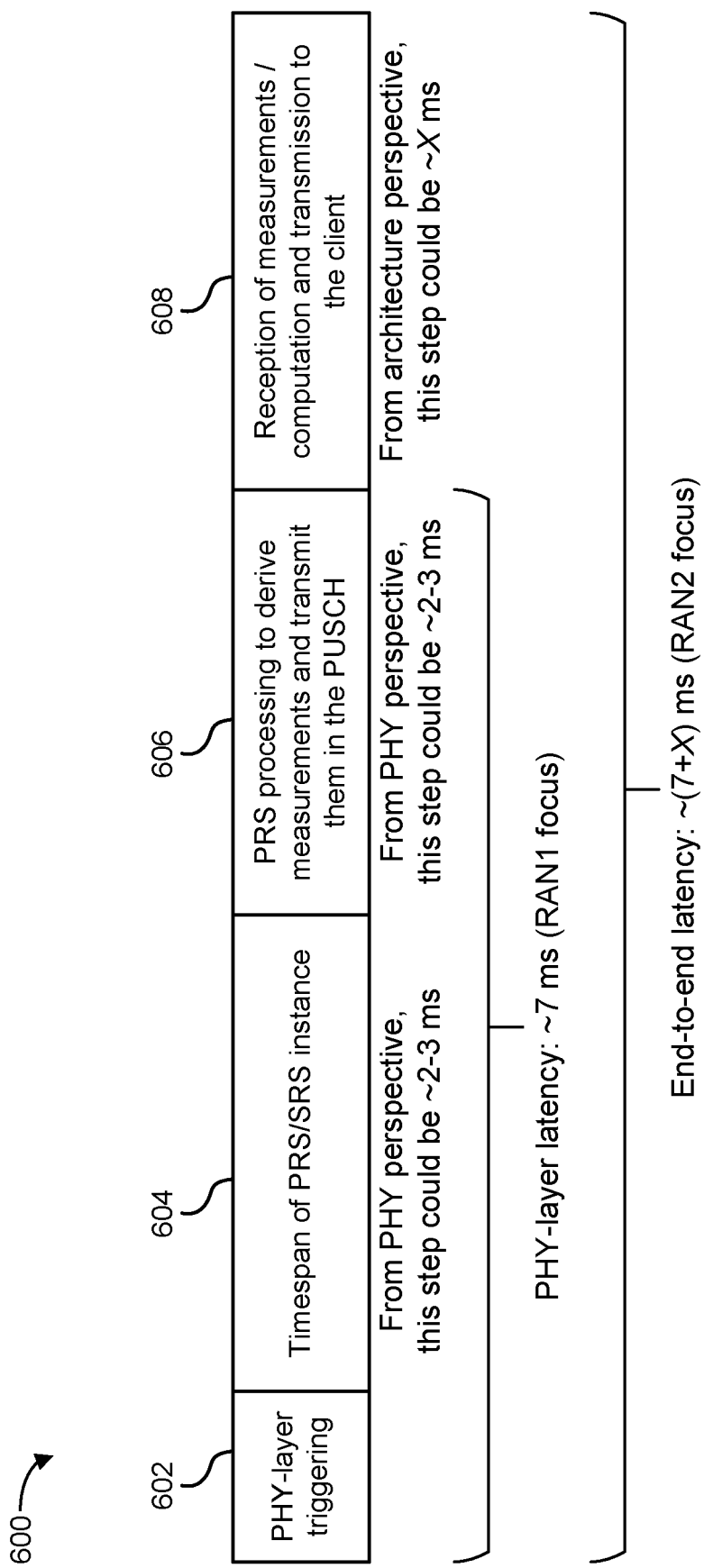
FIG. 6 illustrates an analysis of potential opportunities to reduce latency for positioning methods using positioning reference signals or sounding reference signals.

FIG. 6 illustrates an analysis 600 of the sources of latency for positioning methods using PRS or SRS. Each iteration of positioning using PRS or SRS includes the time 602 required for PHY-layer triggering, the timespan 604 of the PRS or SRS instance, the time 606 for PRS processing to derive measurements and transmit them in the PUSCH, and the time 608 for reception of measurements, for computation, or for both, as well as the time for transmission to the client. RAN1 is focusing on keeping the PHY layer latency to about 7 ms. PHY layer triggering would be applicable for a single-shot location request, and may include configuration or trigger of aperiodic, semiperiodic, or periodic PRS or SRS, as well as a request for a measurement gap (MG), if needed.

Thus, conventional methods of handling of positioning-related reports run the risk that the positioning-related information does not get reported in a timely manner because the positioning-related MAC CEs may not make it into the UL transmission because they don't have sufficient priority.

In order to address the deficiencies of conventional methods of handling positioning-related reports in uplink, the following methods and apparatus for performing the methods are provided.

Lower Layer Reporting (MAC-CE)

According to one aspect, if the UE reports positioning-related measurements, recommendations, requests, etc., to the network through an UL MAC-CE container, then in case of urgent or high-priority messages, or positioning sessions, or measurements, at least two different MAC-CE logical channel IDs are defined, each one associated with a different priority level in the ordered list of UL MAC-CE. An example modified table of priorities is shown below:

TABLE 6

Modified Logical Channel Priority

MAC CE for cell radio network temporary identifier (C-RNTI),
or Data from UL common control channel (CCCH),
or MAC CE for positioning, high priority
MAC CE for configured grant (CG) confirmation,
or MAC CE for multiple entry CG confirmation, TABLE 6-continued Modified Logical Channel Priority or MAC CE for beam failure recovery (BFR)*
MAC CE for sidelink (SL) CG Confirmation
MAC CE for listen-before-talk (LBT) failure
MAC CE for SL buffer status report (BSR) prioritized according to clause 5.22.1.6
MAC CE for BSR, except for BSR included for padding
MAC CE for single entry power headroom report (PHR), or MAC CE for multiple entry PHR
MAC CE for the number of desired guard symbols
MAC CE for pre-emptive BSR
MAC CE for SL-BSR, except for SL-BSR prioritized according to clause 5.22.1.6 and SL-BSR included for padding
Data from any Logical Channel, except data from UL-CCCH, or MAC CE for positioning, low priority
MAC CE for recommended bit rate query
MAC CE for BSR included for padding
MAC CE for SL-BSR included for padding

*Prioritization among MAC CE for CG confirmation, MAC CE for multiple entry CG confirmation, and MAC CE for BFR is up to UE implementation.

The modified logic channel priority table above provides a mechanism by which urgent or high priority MAC CEs for positioning have a higher logical channel priority and are therefore more likely to be included in the uplink. In some aspects, one MAC-CE logical channel ID is used for high priority reports and a different MAC-CE logical channel ID is used for low priority reports.

In some embodiments, there may be a relationship between priority and a QoS of the positioning signal. For example:

In some aspects the UE may be configured in the location request with a configuration that instructs the UE to report measurements, commands, recommendations, etc., to the network using one or the other MAC CE, so that the network can control whether it will be high or low priority the UE report.

In some aspects, positioning reports based on measurement of PRS or other DL signals with high QoS may be given a higher priority while positioning reports based on measurement of PRS or other DL signals with low QoS may be given a lower priority, e.g., there may be an association between the positioning QoS and the mapping into a high priority logical channel MAC-CE or a low priority.

In some aspects, a separate message may be received by the network that determines whether a specific positioning request/session/set of measurements should be mapped into a high or low priority MAC CE. In some aspects, that message may be carried in an RRC or MAC-CE or LPP.

In some aspects, the UE may determine that a specific report is a high-priority one depending on how it is triggered. For example, if the report is triggered by DCI, or it is associated with an on-demand/aperiodic/semi-persistent PRS, then the corresponding measurements should be high priority.

In some aspects, any on-demand request by the UE (e.g., which resources to be transmitted, which PRS resources to be used, which TRPs to transmit PRS, etc.), may be associated with a high priority MAC-CE.

Higher Layer Reporting

According to one aspect, if the UE reports positioning-related measurements, recommendations, requests, etc., to the network through an RRC container, then in case of urgent or high-priority messages, or positioning sessions, or measurements, SRB1 or SRB2 priorities are defined or reused to be associated with high and low priorities of the positioning reports. For example:

In some aspects, the UE may be configured in the location request with a configuration that instructs the UE to report measurements, commands, recommendations, etc., to the network using a specified one or another SRB, so that the network can control whether it will be high or low priority the UE report.

In some aspects, positioning reports based on measurement of PRS or other DL signals with high QoS may be given a higher priority while positioning reports based on measurement of PRS or other DL signals with low QoS may be given a lower priority, e.g., there may be an association between the positioning QoS and the mapping into a specific SRB.

In some aspects, a separate message may be received by the network that determines whether a specific positioning request/session/set of measurements should be mapped into a specific SRB. In some aspects, that message may be carried in an RRC or MAC-CE or LPP.

In some aspects, the UE may determine that a specific report is a high-priority one depending on how it is triggered. For example, if the report is triggered by DCI, or it is associated with an on-demand/aperiodic/semi-persistent PRS, then the corresponding measurements may be associated with a high priority SRB (e.g., SRB1).

In some aspects, any on-demand request by the UE (e.g., which resources to be transmitted, which PRS resources to be used, which TRPs to transmit PRS), may be associated with a high priority SRB (e.g., SRB1).

Figure 7:
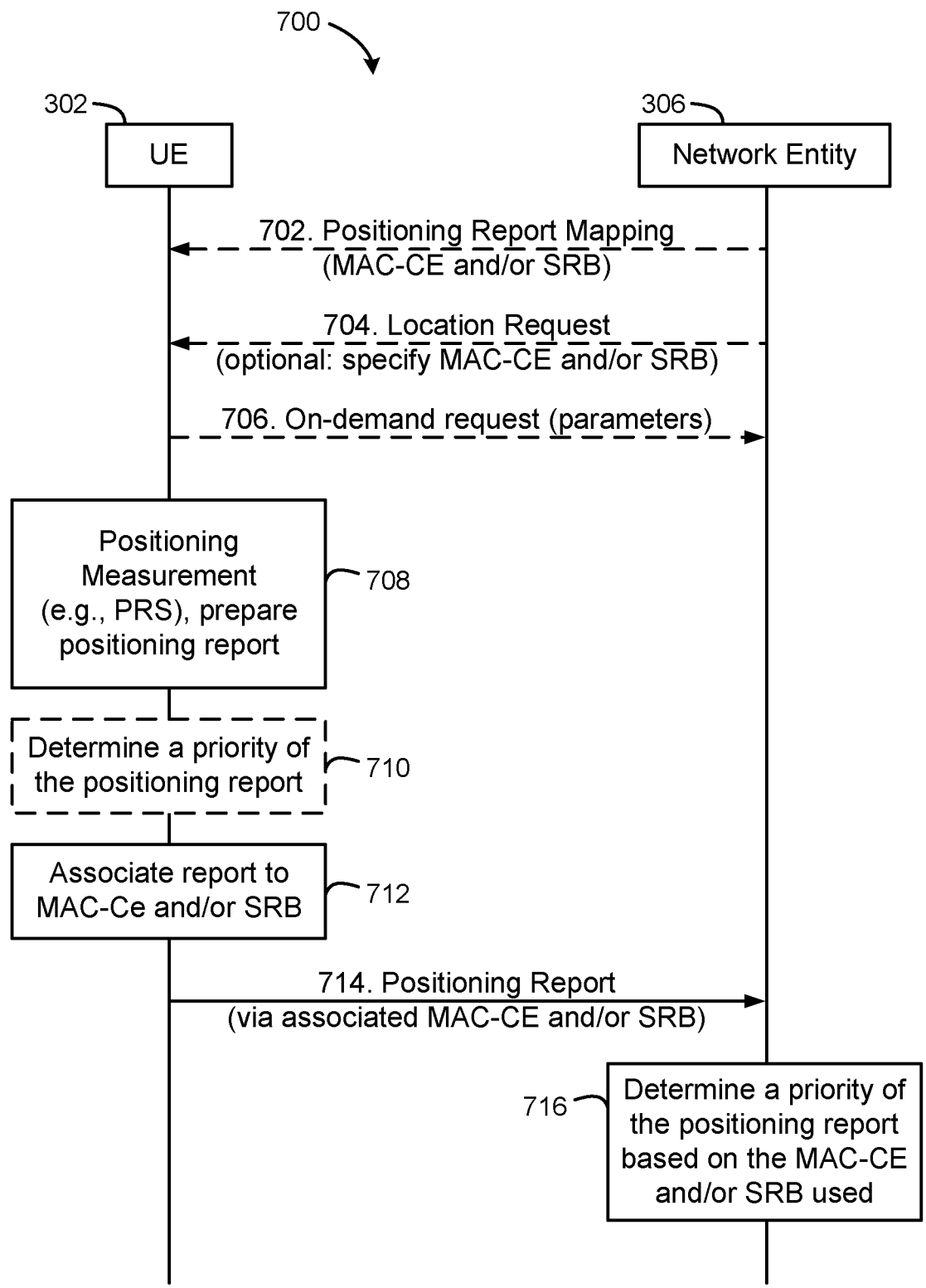
FIGS. 7 to 9 illustrate exemplary methods of wireless communication, according to aspects of the disclosure.

FIG. 7 illustrates an exemplary method 700 of wireless communication, according to aspects of the disclosure. FIG. 7 illustrates an interaction between a UE 302 and a network entity 306, which may be a base station, a location server, another network entity, or some combination thereof.

At 702, the network entity 306 optionally sends a positioning reporting mapping to the UE. In some aspects, the positioning reporting mapping may be sent via RRC, MAC-CE, or LPP. The positioning reporting mapping maps positioning reports to one of multiple MAC-CE logical channel IDs, to one of multiple SRBs, or to one of a set of resources that includes both MAC-CE logical channel IDs and SRBs. In some aspects, the positioning report may be mapped to one or another MAC-CE logical channel ID or SRB based on a priority associated with the positioning report. In some aspects, the priority associated with the positioning report may be based on a mapping of positioning QoS (e.g., a QoS of the positioning session) to priority, based on how the positioning report was triggered, based on some other criterion, or a combination thereof. The positioning report is based on a positioning measurement, which may be performed at the request of the network entity 306 or at the initiative of the UE 302. Thus, in some aspects, at 704, the network entity 306 optionally sends a location request to the UE 302. In some aspects, this request triggers the positioning measurement 708. In other aspects, at 706, the UE 302 optionally sends an on-demand request for PRS resources, the request including parameters, e.g., identifying specific resources, TRPs, etc. In some aspects, this request triggers the positioning measurement 708.

At 708, the UE 302 performs a positioning measurement, e.g., by measuring a PRS, and prepares a positioning report for uplink. In some aspects, the selection of MAC-CE logical channel (for lower level reporting) or SRB (for higher level reporting) is based at least in part on a priority associated with the positioning report. Thus, optionally, at 710, the UE 302 determines a priority of the positioning report. At 712, the UE 302 associates the positioning report to a MAC-CE logical channel ID and/or to an SRB, and at 714, the UE 302 sends the positioning report to the network entity 306 via the MAC-CE logical channel ID and/or SRB that was associated to the positioning report.

At 716, the network entity 306 determines the priority of the positioning report based on the MAC-CE logical channel ID and/or SRB that was used.

Figure 8:
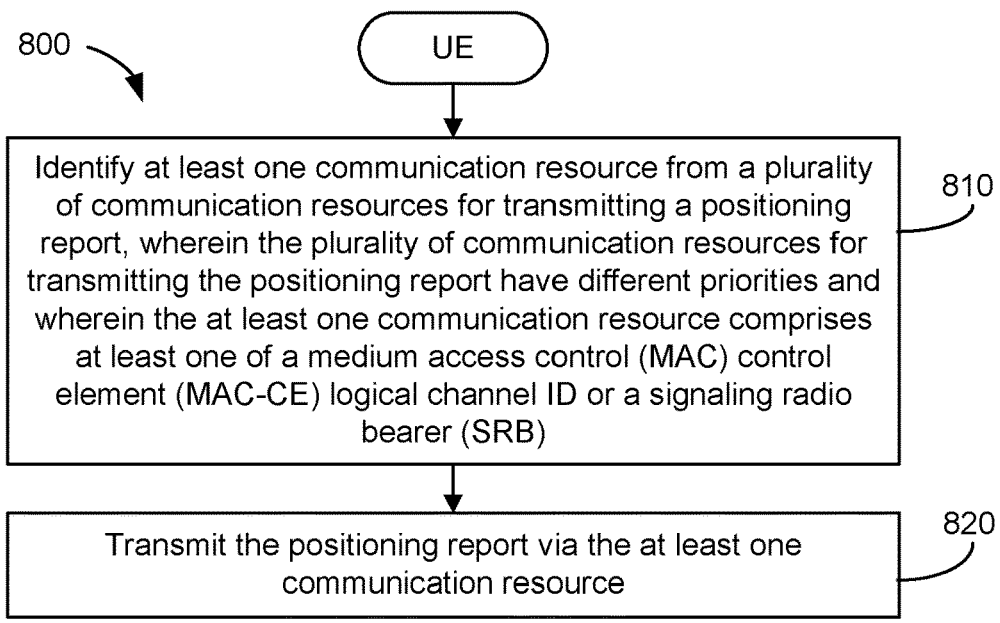

FIG. 8 is a flowchart of an example process 800 associated with prioritization of positioning-related reports in uplink. In some implementations, one or more process blocks of FIG. 8 may be performed by a user equipment (UE) (e.g., UE 104). In some implementations, one or more process blocks of FIG. 8 may be performed by another device or a group of devices separate from or including the UE. Additionally, or alternatively, one or more process blocks of FIG. 8 may be performed by one or more components of UE 302, such as processor(s) 332, memory 340, WWAN transceiver(s) 310, short-range wireless transceiver(s) 320, satellite signal receiver 330, sensor(s) 344, user interface 346, and positioning component(s) 342, any or all of which may be means for performing the operations of process 800.

As shown in FIG. 8, process 800 may include identifying at least one communication resource from a plurality of communication resources for transmitting a positioning report, wherein the plurality of communication resources for transmitting the positioning report have different priorities (block 810). Means for performing the operation of block 810 may include the processor(s) 332, memory 340, or WWAN transceiver(s) 310 of the UE 302. For example, the UE 302 may identify the at least one communication resource from a plurality of communication resources for transmitting a positioning report, e.g., using a mapping stored in memory 340.

In some aspects, identifying the at least one communication resource comprises identifying the at least one communication resource according to a mapping that associates a positioning report priority to one or more of the plurality of communication resources for transmitting the positioning report.

In some aspects, the positioning report is based on measurement of a downlink signal and wherein a priority of the positioning report to be transmitted is based on a mapping of positioning quality of service (QoS) to priority.

In some aspects, the priority of the positioning report to be transmitted is based on a horizontal accuracy, a vertical accuracy, a response time, a velocity request, a vertical coordinate request, or a combination thereof, associated with the positioning QoS.

In some aspects, identifying the at least one communication resource comprises identifying at least one communication resource having a first priority if the positioning report to be transmitted is associated with a high positioning QoS and identifying at least one communication resource having a second priority lower than the first priority if the positioning report to be transmitted is associated with a low positioning QoS.

In some aspects, a priority of the positioning report to be transmitted is based on a mapping of a trigger type of the positioning report to priority.

In some aspects, identifying the at least one communication resource comprises identifying at least one communication resource having a first priority if the positioning report was triggered by downlink control information (DCI)

and identifying at least one communication resource having a second priority if the positioning report is associated with an on-demand, aperiodic, or semi-persistent PRS.

In some aspects, identifying the at least one communication resource comprises identifying the least one communication resource according to a mapping that associates a specific request, session, set of measurements, or a combination thereof, to one or more of the plurality of communication resources for transmitting the positioning report.

In some aspects, identifying the at least one communication resource comprises identifying the at least one communication resource based on parameters within an on-demand request by the UE.

In some aspects, identifying the at least one communication resource based on the parameters within the on-demand request by the UE comprises identifying the at least one communication resource based on which resources are to be transmitted, which PRS resources are to be used, which transmission reception points are to transmit reference signals, or a combination thereof.

As further shown in FIG. 8, process 800 may include transmitting the positioning report via the at least one communication resource, wherein the at least one communication resource comprises at least one of a medium access control (MAC) control element (MAC-CE) logical channel ID or a signaling radio bearer (SRB) (block 820). Means for performing the operation of block 820 may include the processor(s) 332, memory 340, or WWAN transceiver(s) 310 of the UE 302. For example, the UE 302 may transmit the positioning report via the at least one communication resource, using transmitter(s) 314. In some implementations, the at least one communication resource comprises at least one of a medium access control (MAC) control element (MAC-CE) logical channel ID or a signaling radio bearer (SRB).

In some aspects, transmitting the positioning report via the at least one communication resource comprises transmitting the positioning report via at least one of a plurality of MAC-CE logical channel IDs, transmitting the positioning report via at least one of a plurality of SRBs, or transmitting the positioning report via at least one of a plurality comprising at least one MAC-CE logical channel ID and at least one SRB.

In some aspects, the positioning report was generated in response to a location request that specifies one or more of the plurality of communication resources for transmitting the positioning report, and wherein transmitting the positioning report via the at least one communication resource comprises transmitting the positioning report via the one or more communication resources specified by the location request.

Process 800 may include additional implementations, such as any single implementation or any combination of implementations described below and/or in connection with one or more other processes described elsewhere herein. Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
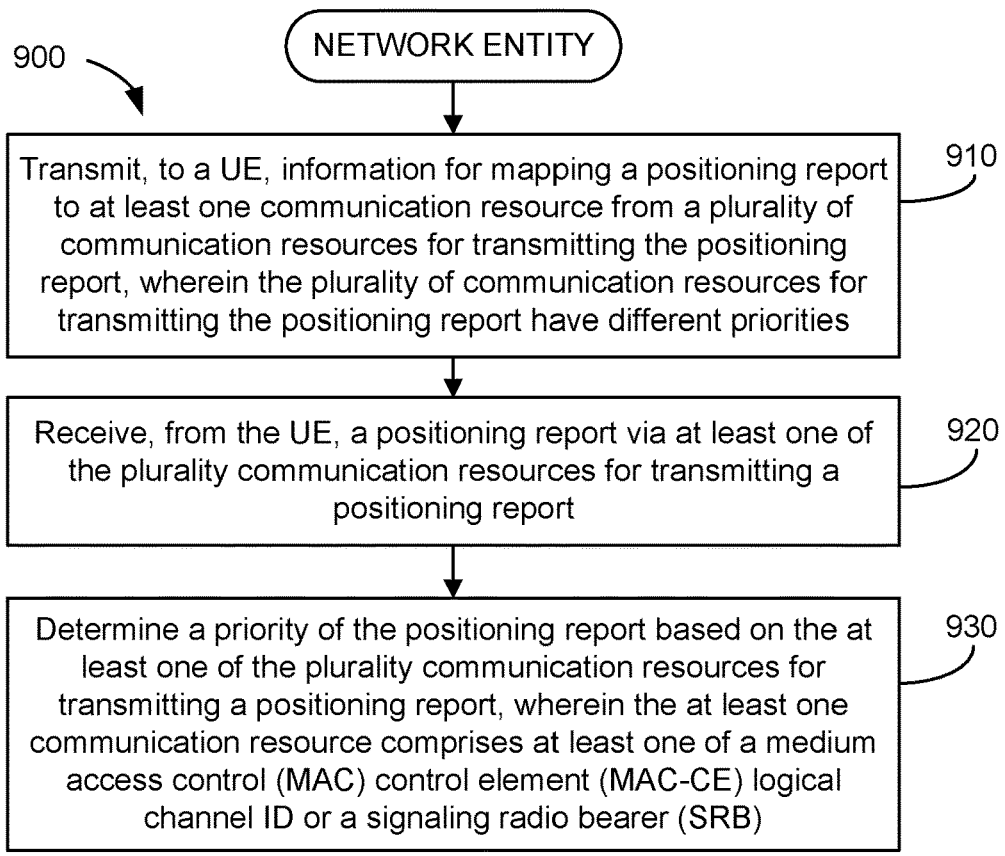

FIG. 9 is a flowchart of an example process 900 associated with prioritization of positioning-related reports in uplink. In some implementations, one or more process blocks of FIG. 9 may be performed by a network entity (e.g., location server 172, location server 230, etc.). In some implementations, one or more process blocks of FIG. 9 may be performed by another device or a group of devices separate from or including the network entity. Additionally, or alternatively, one or more process blocks of FIG. 9 may be performed by one or more components of network entity 306, such as processor(s) 394, memory 396, network transceiver(s) 390, and positioning component(s) 398, any or all of which may be means for performing the operations of process 900.

As shown in FIG. 9, process 900 may include transmitting, to a user equipment (UE), information for mapping a positioning report to at least one communication resource from a plurality of communication resources for transmitting the positioning report, wherein the plurality of communication resources for transmitting the positioning report have different priorities (block 910). Means for performing the operation of block 910 may include the processor(s) 394, memory 396, or network transceiver(s) 390 of the network entity 306. For example, the network entity 306 may transmit, to a user equipment (UE), information for mapping a positioning report to at least one communication resource from a plurality of communication resources for transmitting the positioning report, wherein the plurality of communication resources for transmitting the positioning report have different priorities, using the network interface(s) 390.

In some aspects, transmitting the information for mapping the positioning report to the at least one communication resource from the plurality of communication resources for transmitting the positioning report comprises transmitting a mapping that associates a specific request, session, set of measurements, or a combination thereof, to at least one of the plurality of communication resources, associates a specific positioning report priority to at least one of the plurality of communication resources, or a combination thereof.

As further shown in FIG. 9, process 900 may include receiving, from the UE, a positioning report via at least one of the plurality of communication resources for transmitting the positioning report (block 920). Means for performing the operation of block 920 may include the processor(s) 394, memory 396, or network transceiver(s) 390 of the network entity 306. For example, the network entity 306 may receive, from the UE, a positioning report via at least one of the plurality of communication resources for transmitting the positioning report, using the network interface(s) 390.

As further shown in FIG. 9, process 900 may include determining a priority of the positioning report based on the at least one of the plurality of communication resources for transmitting the positioning report, wherein the at least one communication resource comprises at least one of a medium access control (MAC) control element (MAC-CE) logical channel ID or a signaling radio bearer (SRB) (block 930). Means for performing the operation of block 930 may include the processor(s) 394, memory 396, or network transceiver(s) 390 of the network entity 306. For example, the processor(s) 394 of the network entity 306 may determine a priority of the positioning report based on the communication resource, using a mapping stored in the memory 396. In some implementations, the at least one communication resource comprises at least one of a medium access control (MAC) control element (MAC-CE) logical channel ID or a signaling radio bearer (SRB).

In some aspects, determining the priority of the positioning report based on the at least one of the plurality of communication resources for transmitting the positioning report comprises determining the priority of the positioning report based on the information for mapping.

Process 900 may include additional implementations, such as any single implementation or any combination of implementations described below and/or in connection with one or more other processes described elsewhere herein. Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Among the various technical advantages provided by the various aspects disclosed herein, in at least some aspects, the prioritization of positioning-related reports in uplink provide at least the technical advantage of providing a mechanism which can selectively increase the likelihood that high-priority positioning information will be included in an UL transmission.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: identifying at least one communication resource from a plurality of communication resources for transmitting a positioning report, wherein the plurality of communication resources for transmitting the positioning report have different priorities; and transmitting the positioning report via the at least one communication resource, wherein the at least one communication resource comprises at least one of a medium access control (MAC) control element (MAC-CE) logical channel ID or a signaling radio bearer (SRB).

Clause 2. The method of clause 1, wherein transmitting the positioning report via the at least one communication resource comprises: transmitting the positioning report via at least one of a plurality of MAC-CE logical channel IDs; transmitting the positioning report via at least one of a plurality of SRBs; or transmitting the positioning report via at least one of a plurality comprising at least one MAC-CE logical channel ID and at least one SRB.

Clause 3. The method of any of clauses 1 to 2, wherein the positioning report was generated in response to a location request that specifies one or more of the plurality of communication resources for transmitting the positioning report, and wherein transmitting the positioning report via the at least one communication resource comprises transmitting the positioning report via the one or more communication resources specified by the location request.

Clause 4. The method of any of clauses 1 to 3, wherein identifying the at least one communication resource comprises identifying the at least one communication resource according to a mapping that associates a positioning report priority to one or more of the plurality of communication resources for transmitting the positioning report.

Clause 5. The method of any of clauses 1 to 4, wherein the positioning report is based on measurement of a downlink signal and wherein a priority of the positioning report to be transmitted is based on a mapping of positioning quality of service (QoS) to priority.

Clause 6. The method of clause 5, wherein the priority of the positioning report to be transmitted is based on a horizontal accuracy, a vertical accuracy, a response time, a velocity request, a vertical coordinate request, or a combination thereof, associated with the positioning QoS.

Clause 7. The method of any of clauses 5 to 6, wherein identifying the at least one communication resource comprises identifying at least one communication resource having a first priority if the positioning report to be transmitted is associated with a high positioning QoS and identifying at least one communication resource having a second priority lower than the first priority if the positioning report to be transmitted is associated with a low positioning QoS.

Clause 8. The method of any of clauses 4 to 7, wherein a priority of the positioning report to be transmitted is based on a mapping of a trigger type of the positioning report to priority.

Clause 9. The method of clause 8, wherein identifying the at least one communication resource comprises identifying at least one communication resource having a first priority if the positioning report was triggered by downlink control information (DCI) and identifying at least one communication resource having a second priority if the positioning report is associated with an on-demand, aperiodic, or semi-persistent PRS.

Clause 10. The method of any of clauses 1 to 9, wherein identifying the at least one communication resource comprises identifying the least one communication resource according to a mapping that associates a specific request, session, set of measurements, or a combination thereof, to one or more of the plurality of communication resources for transmitting the positioning report.

Clause 11. The method of any of clauses 1 to 10, wherein identifying the at least one communication resource comprises identifying the at least one communication resource based on parameters within an on-demand request by the UE.

Clause 12. The method of clause 11, wherein identifying the at least one communication resource based on the parameters within the on-demand request by the UE comprises identifying the at least one communication resource based on which resources are to be transmitted, which PRS resources are to be used, which transmission reception points are to transmit reference signals, or a combination thereof.

Clause 13. A method of wireless communication performed by a network entity, comprising: transmitting, to a user equipment (UE), information for mapping a positioning report to at least one communication resource from a plurality of communication resources for transmitting the positioning report, wherein the plurality of communication resources for transmitting the positioning report have different priorities; receiving, from the UE, a positioning report via at least one of the plurality of communication resources for transmitting the positioning report; and determining a priority of the positioning report based on the at least one of the plurality of communication resources for transmitting the positioning report, wherein the at least one communication resource comprises at least one of a medium access control (MAC) control element (MAC-CE) logical channel ID or a signaling radio bearer (SRB).

Clause 14. The method of clause 13, wherein transmitting the information for mapping the positioning report to the at least one communication resource from the plurality of communication resources for transmitting the positioning report comprises transmitting a mapping that: associates a specific request, session, set of measurements, or a combination thereof, to at least one of the plurality of communication resources; associates a specific positioning report priority to at least one of the plurality of communication resources; or a combination thereof.

Clause 15. The method of clause 14, wherein determining the priority of the positioning report based on the at least one of the plurality of communication resources for transmitting the positioning report comprises determining the priority of the positioning report based on the information for mapping.

Clause 16. A user equipment (UE), comprising: a memory; at least one transceiver; and at least one processor communicatively coupled to the memory and the at least one transceiver, the at least one processor configured to: identify at least one communication resource from a plurality of communication resources for transmitting a positioning report, wherein the plurality of communication resources for transmitting the positioning report have different priorities; and transmit, via the at least one transceiver, the positioning report via the at least one communication resource, wherein the at least one communication resource comprises at least one of a medium access control (MAC) control element (MAC-CE) logical channel ID or a signaling radio bearer (SRB).

Clause 17. The UE of clause 16, wherein, to transmit the positioning report via the at least one communication resource, the at least one processor is configured to: transmit, via the at least one transceiver, the positioning report via at least one of a plurality of MAC-CE logical channel IDs; transmit, via the at least one transceiver, the positioning report via at least one of a plurality of SRBs; or transmit, via the at least one transceiver, the positioning report via at least one of a plurality comprising at least one MAC-CE logical channel ID and at least one SRB.

Clause 18. The UE of any of clauses 16 to 17, wherein the positioning report was generated in response to a location request that specifies one or more of the plurality of communication resources for transmitting the positioning report, and wherein transmitting the positioning report via the at least one communication resource comprises transmitting the positioning report via the one or more communication resources specified by the location request.

Clause 19. The UE of any of clauses 16 to 18, wherein, to identify the at least one communication resource, the at least one processor is configured to identify the at least one communication resource according to a mapping that associates a positioning report priority to one or more of the plurality of communication resources for transmitting the positioning report.

Clause 20. The UE of any of clauses 16 to 19, wherein the positioning report is based on measurement of a downlink signal and wherein a priority of the positioning report to be transmitted is based on a mapping of positioning quality of service (QoS) to priority.

Clause 21. The UE of clause 20, wherein the priority of the positioning report to be transmitted is based on a horizontal accuracy, a vertical accuracy, a response time, a velocity request, a vertical coordinate request, or a combination thereof, associated with the positioning QoS.

Clause 22. The UE of any of clauses 20 to 21, wherein, to identify the at least one communication resource, the at least one processor is configured to identify at least one communication resource having a first priority if the positioning report to be transmitted is associated with a high positioning QoS and identifying at least one communication resource having a second priority lower than the first priority if the positioning report to be transmitted is associated with a low positioning QoS.

Clause 23. The UE of any of clauses 19 to 22, wherein a priority of the positioning report to be transmitted is based on a mapping of a trigger type of the positioning report to priority.

Clause 24. The UE of clause 23, wherein, to identify the at least one communication resource, the at least one processor is configured to identify at least one communication resource having a first priority if the positioning report was triggered by downlink control information (DCI) and identifying at least one communication resource having a second priority if the positioning report is associated with an on-demand, aperiodic, or semi-persistent PRS.

Clause 25. The UE of any of clauses 16 to 24, wherein, to identify the at least one communication resource, the at least one processor is configured to identify the least one communication resource according to a mapping that associates a specific request, session, set of measurements, or a combination thereof, to one or more of the plurality of communication resources for transmitting the positioning report.

Clause 26. The UE of any of clauses 16 to 25, wherein, to identify the at least one communication resource, the at least one processor is configured to identify the at least one communication resource based on parameters within an on-demand request by the UE.

Clause 27. The UE of clause 26, wherein, to identify the at least one communication resource based on the parameters within the on-demand request by the UE, the at least one processor is configured to identify the at least one communication resource based on which resources are to be transmitted, which PRS resources are to be used, which transmission reception points are to transmit reference signals, or a combination thereof.

Clause 28. A network entity, comprising: a memory; at least one transceiver; and at least one processor communicatively coupled to the memory and the at least one transceiver, the at least one processor configured to: transmit, via the at least one transceiver, to a user equipment (UE), information for mapping a positioning report to at least one communication resource from a plurality of communication resources for transmitting the positioning report, wherein the plurality of communication resources for transmitting the positioning report have different priorities; receive, via the at least one transceiver, from the UE, a positioning report via at least one of the plurality of communication resources for transmitting the positioning report; and determine a priority of the positioning report based on the at least one of the plurality of communication resources for transmitting the positioning report, wherein the at least one communication resource comprises at least one of a medium access control (MAC) control element (MAC-CE) logical channel ID or a signaling radio bearer (SRB).

Clause 29. The network entity of clause 28, wherein, to transmit the information for mapping the positioning report to the at least one communication resource from the plurality of communication resources for transmitting the positioning report, the at least one processor is configured to transmit a mapping that: associates a specific request, session, set of measurements, or a combination thereof, to at least one of the plurality of communication resources; associates a specific positioning report priority to at least one of the plurality of communication resources; or a combination thereof.

Clause 30. The network entity of clause 29, wherein, to determine the priority of the positioning report based on the at least one of the plurality of communication resources for transmitting the positioning report, the at least one processor is configured to determine the priority of the positioning report based on the information for mapping.

Clause 31. An apparatus comprising a memory, a transceiver, and a processor communicatively coupled to the memory and the transceiver, the memory, the transceiver, and the processor configured to perform a method according to any of clauses 1 to 15.

Clause 32. An apparatus comprising means for performing a method according to any of clauses 1 to 15.

Clause 33. A non-transitory computer-readable medium storing computer-executable instructions, the computer-executable comprising at least one instruction for causing a computer or processor to perform a method according to any of clauses 1 to 15.

Additional aspects include the following:

In an aspect, a method of wireless communication performed by a user equipment (UE) includes associating a positioning report to one of a plurality of medium access control (MAC) control element (CE) (MAC-CE) logical channel IDs having different priorities; and sending the positioning report via the associated MAC-CE logical channel ID.

In some aspects, the positioning report was generated in response to a location request that specifies to which one of the plurality of MAC-CE logical channel IDs the positioning report should be associated and associating the positioning report to one of a plurality of MAC-CE logical channel IDs having different priorities comprises associating the positioning report to a MAC-CE logical channel ID as specified by the location request.

In some aspects, associating the positioning report to one of a plurality of MAC-CE logical channel IDs having different priorities comprises determining a priority of the positioning report and associating the positioning report to one of a plurality of MAC-CE logical channel IDs based on a priority of the positioning report.

In some aspects, the positioning report is based on measurement of a positioning reference signal (PRS) and the priority of the positioning report is based on a quality of service (QoS) of the PRS.

In some aspects, the priority of the positioning report is based on a horizontal accuracy, a vertical accuracy, a response time, a velocity request, a vertical coordinate request, or a combination thereof, associated with the positioning QoS.

In some aspects, associating the positioning report to one of a plurality of MAC-CE logical channel IDs having different priorities comprises associating a positioning report based on a PRS with a high QoS to a MAC-CE logical channel ID with a first priority and associating a positioning report based on a PRS with a low QoS to a MAC-CE logical channel ID with a second priority lower than the first priority.

In some aspects, associating the positioning report to one of a plurality of MAC-CE logical channel IDs having different priorities comprises associating the positioning report based on a trigger type of the positioning report.

In some aspects, the positioning report is associated to one of a plurality of MAC-CE logical channel IDs according to whether the positioning report was triggered by downlink control information (DCI), or associated with an on-demand, aperiodic, or semi-persistent PRS.

In some aspects, associating the positioning report to one of a plurality of MAC-CE logical channel IDs based on the priority of the positioning report comprises associating the positioning report to one of the plurality of MAC-CE logical channel IDs according to a mapping that associates a positioning report priority to one of the plurality of MAC-CE logical channel IDs.

In some aspects, associating the positioning report to one of a plurality of MAC-CE logical channel IDs having different priorities comprises associating the positioning report to one of a plurality of MAC-CE logical channel IDs according to a mapping that associates a specific request, session, set of measurements, or a combination thereof, to one of the plurality of MAC-CE logical channel IDs.

In some aspects, associating the positioning report to one of a plurality of MAC-CE logical channel IDs having different priorities comprises associating a positioning report based on parameters within an on-demand request by the UE.

In some aspects, associating a positioning report based on parameters within an on-demand request by the UE comprises associating a positioning report based on which resources are to be transmitted, which PRS resources are to be used, which transmission reception points are to transmit reference signals, or a combination thereof.

In an aspect, a method of wireless communication performed by a user equipment (UE) includes associating a positioning report to one of a plurality of signaling radio bearer (SRBs) having different priorities; and sending the positioning report via the associated SRB.

In some aspects, the positioning report was generated in response to a location request that specifies to which one of the plurality of SRBs the positioning report should be associated and associating the positioning report to one of a plurality of SRBs having different priorities comprises associating the positioning report to a SRB as specified by the location request.

In some aspects, associating the positioning report to one of a plurality of SRBs having different priorities comprises associating the positioning report to one of a plurality of SRBs based on a priority of the positioning report.

In some aspects, the positioning report is based on measurement of a positioning reference signal (PRS) and the priority of the positioning report is based on a quality of service (QoS) of the PRS.

In some aspects, the priority of the positioning report is based on a horizontal accuracy, a vertical accuracy, a response time, a velocity request, a vertical coordinate request, or a combination thereof, associated with the PRS.

In some aspects, associating the positioning report to one of a plurality of SRBs having different priorities comprises associating a positioning report based on a PRS with a high QoS to a SRB with a first priority and associating a positioning report based on a PRS with a low QoS to a SRB with a second priority lower than the first priority.

In some aspects, associating the positioning report to one of a plurality of SRBs having different priorities comprises associating the positioning report based on a trigger type of the positioning report.

In some aspects, the positioning report is associated to one of a plurality of SRBs according to whether the positioning report was triggered by downlink control information (DCI), or associated with an on-demand, aperiodic, or semi-persistent PRS.

In some aspects, associating the positioning report to one of a plurality of SRBs based on the priority of the positioning report comprises associating the positioning report to one of the plurality of SRBs according to a mapping that associates a positioning report priority to one of the plurality of SRBs.

In some aspects, associating the positioning report to one of a plurality of SRBs having different priorities comprises associating the positioning report to one of a plurality of SRBs according to a mapping that associates a specific request, session, set of measurements, or a combination thereof, to one of the plurality of SRBs.

In some aspects, associating the positioning report to one of a plurality of SRBs having different priorities comprises associating a positioning report based on parameters within an on-demand request by the UE.

In some aspects, associating a positioning report based on parameters within an on-demand request by the UE comprises associating a positioning report based on which resources are to be transmitted, which PRS resources are to be used, which transmission reception points are to transmit reference signals, or a combination thereof.

In an aspect, a method of wireless communication performed by a network entity includes transmitting, to a user equipment (UE), information for mapping a positioning report to one of a plurality of medium access control (MAC) control element (CE) (MAC-CE) logical channel IDs having different priorities; receiving, from the UE, a positioning report via one of the plurality of MAC-CE logical channel IDs; and determining a priority of the positioning report based on the MAC-CE logical channel ID.

In some aspects, transmitting information for mapping a positioning report to one of a plurality of medium access control (MAC) control element (CE) (MAC-CE) logical channel IDs having different priorities comprises transmitting a mapping that associates a specific request, session, set of measurements, or a combination thereof, to one of the plurality of MAC-CE logical channel IDs, associates a specific positioning report priority to one of the plurality of MAC-CE logical channel IDs, or a combination thereof.

In some aspects, determining the priority of the positioning report based on the MAC-CE logical channel ID comprises determining the priority of the positioning report based on the information for mapping.

In an aspect, a method of wireless communication performed by a network entity includes transmitting, to a user equipment (UE), information for mapping a positioning report to one of a plurality of signaling radio bearers (SRBs) having different priorities; receiving, from the UE, a positioning report via one of the plurality of SRBs; and determining a priority of the positioning report based on the SRB.

In some aspects, transmitting information for mapping a positioning report to one of a plurality of SRBs having different priorities comprises transmitting a mapping that associates a specific request, session, set of measurements, or a combination thereof, to one of the plurality of SRBs, associates a specific positioning report priority to one of the plurality of SRBs, or a combination thereof.

In some aspects, determining the priority of the positioning report based on the one SRB comprises determining the priority of the positioning report based on the information for mapping.

In an aspect, a user equipment (UE) includes a memory; at least one transceiver; and at least one processor communicatively coupled to the memory and the at least one transceiver, the at least one processor configured to: associate a positioning report to one of a plurality of medium access control (MAC) control element (CE) (MAC-CE) logical channel IDs having different priorities; and cause the at least one transceiver to send the positioning report via the associated MAC-CE logical channel ID.

In some aspects, the positioning report was generated in response to a location request that specifies to which one of the plurality of MAC-CE logical channel IDs the positioning report should be associated and associating the positioning report to one of a plurality of MAC-CE logical channel IDs having different priorities comprises associating the positioning report to a MAC-CE logical channel ID as specified by the location request.

In some aspects, associating the positioning report to one of a plurality of MAC-CE logical channel IDs having different priorities comprises determining a priority of the positioning report and associating the positioning report to one of a plurality of MAC-CE logical channel IDs based on a priority of the positioning report.

In some aspects, the positioning report is based on measurement of a positioning reference signal (PRS) and the priority of the positioning report is based on a quality of service (QoS) of the PRS.

In some aspects, the priority of the positioning report is based on a horizontal accuracy, a vertical accuracy, a response time, a velocity request, a vertical coordinate request, or a combination thereof, associated with the PRS.

In some aspects, associating the positioning report to one of a plurality of MAC-CE logical channel IDs having different priorities comprises associating a positioning report based on a PRS with a high QoS to a MAC-CE logical channel ID with a first priority and associating a positioning report based on a PRS with a low QoS to a MAC-CE logical channel ID with a second priority lower than the first priority.

In some aspects, associating the positioning report to one of a plurality of MAC-CE logical channel IDs having different priorities comprises associating the positioning report based on a trigger type of the positioning report.

In some aspects, the positioning report is associated to one of a plurality of MAC-CE logical channel IDs according to whether the positioning report was triggered by downlink control information (DCI), or associated with an on-demand, aperiodic, or semi-persistent PRS.

In some aspects, associating the positioning report to one of a plurality of MAC-CE logical channel IDs based on the priority of the positioning report comprises associating the positioning report to one of the plurality of MAC-CE logical channel IDs according to a mapping that associates a positioning report priority to one of the plurality of MAC-CE logical channel IDs.

In some aspects, associating the positioning report to one of a plurality of MAC-CE logical channel IDs having different priorities comprises associating the positioning report to one of a plurality of MAC-CE logical channel IDs according to a mapping that associates a specific request, session, set of measurements, or a combination thereof, to one of the plurality of MAC-CE logical channel IDs.

In some aspects, associating the positioning report to one of a plurality of MAC-CE logical channel IDs having different priorities comprises associating a positioning report based on parameters within an on-demand request by the UE.

In some aspects, associating a positioning report based on parameters within an on-demand request by the UE comprises associating a positioning report based on which resources are to be transmitted, which PRS resources are to be used, which transmission reception points are to transmit reference signals, or a combination thereof.

In an aspect, a user equipment (UE) includes a memory; at least one transceiver; and at least one processor communicatively coupled to the memory and the at least one transceiver, the at least one processor configured to: associate a positioning report to one of a plurality of signaling radio bearer (SRBs) having different priorities; and cause the at least one transceiver to send the positioning report via the associated SRB.

In some aspects, the positioning report was generated in response to a location request that specifies to which one of the plurality of SRBs the positioning report should be associated and associating the positioning report to one of a plurality of SRBs having different priorities comprises associating the positioning report to a SRB as specified by the location request.

In some aspects, associating the positioning report to one of a plurality of SRBs having different priorities comprises associating the positioning report to one of a plurality of SRBs based on a priority of the positioning report.

In some aspects, the positioning report is based on measurement of a positioning reference signal (PRS) and the priority of the positioning report is based on a quality of service (QoS) of the PRS.

In some aspects, the priority of the positioning report is based on a horizontal accuracy, a vertical accuracy, a response time, a velocity request, a vertical coordinate request, or a combination thereof, associated with the PRS.

In some aspects, associating the positioning report to one of a plurality of SRBs having different priorities comprises associating a positioning report based on a PRS with a high QoS to a SRB with a first priority and associating a positioning report based on a PRS with a low QoS to a SRB with a second priority lower than the first priority.

In some aspects, associating the positioning report to one of a plurality of SRBs having different priorities comprises associating the positioning report based on a trigger type of the positioning report.

In some aspects, the positioning report is associated to one of a plurality of SRBs according to whether the positioning report was triggered by downlink control information (DCI), or associated with an on-demand, aperiodic, or semi-persistent PRS.

In some aspects, associating the positioning report to one of a plurality of SRBs based on the priority of the positioning report comprises associating the positioning report to one of the plurality of SRBs according to a mapping that associates a positioning report priority to one of the plurality of SRBs.

In some aspects, associating the positioning report to one of a plurality of SRBs having different priorities comprises associating the positioning report to one of a plurality of SRBs according to a mapping that associates a specific request, session, set of measurements, or a combination thereof, to one of the plurality of SRBs.

In some aspects, associating the positioning report to one of a plurality of SRBs having different priorities comprises associating a positioning report based on parameters within an on-demand request by the UE.

In some aspects, associating a positioning report based on parameters within an on-demand request by the UE comprises associating a positioning report based on which resources are to be transmitted, which PRS resources are to be used, which transmission reception points are to transmit reference signals, or a combination thereof.

In an aspect, a network entity includes a memory; at least one network interface; and at least one processor communicatively coupled to the memory and the at least one network interface, the at least one processor configured to: cause the at least one network interface to transmit, to a user equipment (UE), information for mapping a positioning report to one of a plurality of medium access control (MAC) control element (CE) (MAC-CE) logical channel IDs having different priorities; receive, from the UE, a positioning report via one of the plurality of MAC-CE logical channel IDs; and determine a priority of the positioning report based on the MAC-CE logical channel ID.

In an aspect, a network entity includes a memory; at least one network interface; and at least one processor communicatively coupled to the memory and the at least one network interface, the at least one processor configured to: cause the at least one network interface to transmit, to a user equipment (UE), information for mapping a positioning report to one of a plurality of signaling radio bearers (SRBs) having different priorities; receive, from the UE, a positioning report via one of the plurality of SRBs; and determine a priority of the positioning report based on the SRB.

In an aspect, a user equipment (UE) includes means for associating a positioning report to one of a plurality of medium access control (MAC) control element (CE) (MAC-CE) logical channel IDs having different priorities; and means for sending the positioning report via the associated MAC-CE logical channel ID.

In an aspect, a user equipment (UE) includes means for associating a positioning report to one of a plurality of signaling radio bearer (SRBs) having different priorities; and means for sending the positioning report via the associated SRB.

In an aspect, a network entity includes means for transmitting, to a user equipment (UE), information for mapping a positioning report to one of a plurality of medium access control (MAC) control element (CE) (MAC-CE) logical channel IDs having different priorities; means for receiving, from the UE, a positioning report via one of the plurality of MAC-CE logical channel IDs; and means for determining a priority of the positioning report based on the MAC-CE logical channel ID.

In an aspect, a network entity includes means for transmitting, to a user equipment (UE), information for mapping a positioning report to one of a plurality of signaling radio bearers (SRBs) having different priorities; means for receiving, from the UE, a positioning report via one of the plurality of SRBs; and means for determining a priority of the positioning report based on the SRB.

In an aspect, a non-transitory computer-readable medium storing computer-executable instructions includes at least one instruction instructing a user equipment (UE) to associate a positioning report to one of a plurality of medium access control (MAC) control element (CE) (MAC-CE) logical channel IDs having different priorities; and at least one instruction instructing the UE to cause at least one transceiver to send the positioning report via the associated MAC-CE logical channel ID.

In an aspect, a non-transitory computer-readable medium storing computer-executable instructions includes at least one instruction instructing a user equipment (UE) to associate a positioning report to one of a plurality of signaling radio bearer (SRBs) having different priorities; and at least one instruction instructing the UE to cause at least one transceiver to send the positioning report via the associated SRB.

In an aspect, a non-transitory computer-readable medium storing computer-executable instructions includes at least one instruction instructing a network entity to cause at least one network interface to transmit, to a user equipment (UE), information for mapping a positioning report to one of a plurality of medium access control (MAC) control element (CE) (MAC-CE) logical channel IDs having different priorities; at least one instruction instructing the network entity to receive, from the UE, a positioning report via one of the plurality of MAC-CE logical channel IDs; and at least one instruction instructing the network entity to determine a priority of the positioning report based on the MAC-CE logical channel ID.

In an aspect, a non-transitory computer-readable medium storing computer-executable instructions includes at least one instruction instructing a network entity to cause at least one network interface to transmit, to a user equipment (UE), information for mapping a positioning report to one of a plurality of signaling radio bearers (SRBs) having different priorities; at least one instruction instructing the network entity to receive, from the UE, a positioning report via one of the plurality of SRBs; and at least one instruction instructing the network entity to determine a priority of the positioning report based on the SRB.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, two or more microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
    identifying at least one communication resource from a plurality of communication resources for transmitting a positioning report that is based on measurement of downlink signals by the UE, wherein the plurality of communication resources for transmitting the positioning report have different priorities; and transmitting the positioning report via the at least one communication resource,
wherein the at least one communication resource comprises at least one of a medium access control (MAC) control element (MAC-CE) logical channel ID or a signaling radio bearer (SRB).

2. The method of claim 1, wherein transmitting the positioning report via the at least one communication resource comprises:
  transmitting the positioning report via at least one of a plurality of MAC-CE logical channel IDs;
  transmitting the positioning report via at least one of a plurality of SRBs; or
  transmitting the positioning report via at least one of a plurality comprising at least one MAC-CE logical channel ID and at least one SRB.

3. The method of claim 1, wherein the positioning report was generated in response to a location request that specifies one or more of the plurality of communication resources for transmitting the positioning report, and wherein transmitting the positioning report via the at least one communication resource comprises transmitting the positioning report via the one or more communication resources specified by the location request.

4. The method of claim 1, wherein identifying the at least one communication resource comprises identifying the at least one communication resource according to a mapping that associates a positioning report priority to one or more of the plurality of communication resources for transmitting the positioning report.

5. The method of claim 1, wherein the positioning report is based on measurement of a downlink signal and wherein a priority of the positioning report to be transmitted is based on a mapping of positioning quality of service (QoS) to priority.

6. The method of claim 5, wherein the priority of the positioning report to be transmitted is based on a horizontal accuracy, a vertical accuracy, a response time, a velocity request, a vertical coordinate request, or a combination thereof, associated with the positioning QoS.

7. The method of claim 5, wherein identifying the at least one communication resource comprises identifying at least one communication resource having a first priority if the positioning report to be transmitted is associated with a high positioning QoS and identifying at least one communication resource having a second priority lower than the first priority if the positioning report to be transmitted is associated with a low positioning QoS.

8. The method of claim 4, wherein a priority of the positioning report to be transmitted is based on a mapping of a trigger type of the positioning report to priority.

9. The method of claim 8, wherein identifying the at least one communication resource comprises identifying at least one communication resource having a first priority if the positioning report was triggered by downlink control information (DCI) and identifying at least one communication resource having a second priority if the positioning report is associated with an on-demand, aperiodic, or semi-persistent PRS.

10. The method of claim 1, wherein identifying the at least one communication resource comprises identifying the least one communication resource according to a mapping that associates a specific request, session, set of measurements, or a combination thereof, to one or more of the plurality of communication resources for transmitting the positioning report.

11. The method of claim 1, wherein identifying the at least one communication resource comprises identifying the at least one communication resource based on parameters within an on-demand request by the UE.

12. The method of claim 11, wherein identifying the at least one communication resource based on the parameters within the on-demand request by the UE comprises identifying the at least one communication resource based on which resources are to be transmitted, which PRS resources are to be used, which transmission reception points are to transmit reference signals, or a combination thereof.

13. A method of wireless communication performed by a network entity, comprising:
  transmitting, to a user equipment (UE), information for mapping a positioning report that is based on measurement of downlink signals by the UE to at least one communication resource from a plurality of communication resources for transmitting the positioning report, wherein the plurality of communication resources for transmitting the positioning report have different priorities;
  receiving, from the UE, a positioning report that is based on measurement of downlink signals by the UE via at least one of the plurality of communication resources for transmitting the positioning report; and
  determining a priority of the positioning report based on the at least one of the plurality of communication resources for transmitting the positioning report,
  wherein the at least one communication resource comprises at least one of a medium access control (MAC) control element (MAC-CE) logical channel ID or a signaling radio bearer (SRB).

14. The method of claim 13, wherein transmitting the information for mapping the positioning report to the at least one communication resource from the plurality of communication resources for transmitting the positioning report comprises transmitting a mapping that:
  associates a specific request, session, set of measurements, or a combination thereof, to at least one of the plurality of communication resources;
  associates a specific positioning report priority to at least one of the plurality of communication resources;
  or both.

15. The method of claim 14, wherein determining the priority of the positioning report based on the at least one of the plurality of communication resources for transmitting the positioning report comprises determining the priority of the positioning report based on the information for mapping.

16. A user equipment (UE), comprising:
  a memory;
  at least one transceiver; and
  at least one processor communicatively coupled to the memory and the at least one transceiver, the at least one processor configured to:
    identify at least one communication resource from a plurality of communication resources for transmitting a positioning report that is based on measurement of downlink signals by the UE, wherein the plurality of communication resources for transmitting the positioning report have different priorities; and
    transmit, via the at least one transceiver, the positioning report via the at least one communication resource,
    wherein the at least one communication resource comprises at least one of a medium access control (MAC) control element (MAC-CE) logical channel ID or a signaling radio bearer (SRB).

17. The UE of claim 16, wherein, to transmit the positioning report via the at least one communication resource, the at least one processor is configured to:
- transmit, via the at least one transceiver, the positioning report via at least one of a plurality of MAC-CE logical channel IDs;
- transmit, via the at least one transceiver, the positioning report via at least one of a plurality of SRB s; or
- transmit, via the at least one transceiver, the positioning report via at least one of a plurality comprising at least one MAC-CE logical channel ID and at least one SRB.

18. The UE of claim 16, wherein the positioning report was generated in response to a location request that specifies one or more of the plurality of communication resources for transmitting the positioning report, and wherein transmitting the positioning report via the at least one communication resource comprises transmitting the positioning report via the one or more communication resources specified by the location request.

19. The UE of claim 16, wherein, to identify the at least one communication resource, the at least one processor is configured to identify the at least one communication resource according to a mapping that associates a positioning report priority to one or more of the plurality of communication resources for transmitting the positioning report.

20. The UE of claim 16, wherein the positioning report is based on measurement of a downlink signal and wherein a priority of the positioning report to be transmitted is based on a mapping of positioning quality of service (QoS) to priority.

21. The UE of claim 20, wherein the priority of the positioning report to be transmitted is based on a horizontal accuracy, a vertical accuracy, a response time, a velocity request, a vertical coordinate request, or a combination thereof, associated with the positioning QoS.

22. The UE of claim 20, wherein, to identify the at least one communication resource, the at least one processor is configured to identify at least one communication resource having a first priority if the positioning report to be transmitted is associated with a high positioning QoS and identifying at least one communication resource having a second priority lower than the first priority if the positioning report to be transmitted is associated with a low positioning QoS.

23. The UE of claim 19, wherein a priority of the positioning report to be transmitted is based on a mapping of a trigger type of the positioning report to priority.

24. The UE of claim 23, wherein, to identify the at least one communication resource, the at least one processor is configured to identify at least one communication resource having a first priority if the positioning report was triggered by downlink control information (DCI) and identifying at least one communication resource having a second priority if the positioning report is associated with an on-demand, aperiodic, or semi-persistent PRS.

25. The UE of claim 16, wherein, to identify the at least one communication resource, the at least one processor is configured to identify the least one communication resource according to a mapping that associates a specific request, session, set of measurements, or a combination thereof, to one or more of the plurality of communication resources for transmitting the positioning report.

26. The UE of claim 16, wherein, to identify the at least one communication resource, the at least one processor is configured to identify the at least one communication resource based on parameters within an on-demand request by the UE.

27. The UE of claim 26, wherein, to identify the at least one communication resource based on the parameters within the on-demand request by the UE, the at least one processor is configured to identify the at least one communication resource based on which resources are to be transmitted, which PRS resources are to be used, which transmission reception points are to transmit reference signals, or a combination thereof.

28. A network entity, comprising:
- a memory;
- at least one transceiver; and
- at least one processor communicatively coupled to the memory and the at least one transceiver, the at least one processor configured to:
  - transmit, via the at least one transceiver, to a user equipment (UE), information for mapping a positioning report that is based on measurement of downlink signals by the UE to at least one communication resource from a plurality of communication resources for transmitting the positioning report, wherein the plurality of communication resources for transmitting the positioning report have different priorities;
  - receive, via the at least one transceiver, from the UE, a positioning report that is based on measurement of downlink signals by the UE via at least one of the plurality of communication resources for transmitting the positioning report; and
  - determine a priority of the positioning report based on the at least one of the plurality of communication resources for transmitting the positioning report,
  - wherein the at least one communication resource comprises at least one of a medium access control (MAC) control element (MAC-CE) logical channel ID or a signaling radio bearer (SRB).

29. The network entity of claim 28, wherein, to transmit the information for mapping the positioning report to the at least one communication resource from the plurality of communication resources for transmitting the positioning report, the at least one processor is configured to transmit a mapping that:
- associates a specific request, session, set of measurements, or a combination thereof, to at least one of the plurality of communication resources;
- associates a specific positioning report priority to at least one of the plurality of communication resources;
- or both.

30. The network entity of claim 29, wherein, to determine the priority of the positioning report based on the at least one of the plurality of communication resources for transmitting the positioning report, the at least one processor is configured to determine the priority of the positioning report based on the information for mapping.

* * * * *